(12) United States Patent
Hellman et al.

(10) Patent No.: US 10,558,681 B2
(45) Date of Patent: Feb. 11, 2020

(54) AUTOMATED COMPUTER VISUALIZATION AND INTERACTION WITH BIG DATA

(71) Applicant: Socrata, Inc., Seattle, WA (US)

(72) Inventors: Karin Hellman, Seattle, WA (US);
Daan Lindhout, Seattle, WA (US);
Marc Slemko, Seattle, WA (US);
Jessica Locke, Bellevue, WA (US);
Steven Greenberg, Seattle, WA (US);
Franklin Williams, Seattle, WA (US);
Saf Rabah, Seattle, WA (US); Giacomo Ferrari, Redmond, WA (US); Randy Antler, Seattle, WA (US); Marc Millstone, Seattle, WA (US); Ben McInnis, Seattle, WA (US)

(73) Assignee: Socrata, Inc., Seattle, WA (US)

( * ) Notice: Subject to any disclaimer, the term of this patent is extended or adjusted under 35 U.S.C. 154(b) by 196 days.

(21) Appl. No.: 15/414,633

(22) Filed: Jan. 25, 2017

(65) Prior Publication Data
US 2017/0212944 A1 Jul. 27, 2017

Related U.S. Application Data

(60) Provisional application No. 62/287,366, filed on Jan. 26, 2016.

(51) Int. Cl.
*G06F 17/30* (2006.01)
*G06F 16/26* (2019.01)
(Continued)

(52) U.S. Cl.
CPC .......... *G06F 16/26* (2019.01); *G06F 16/2423* (2019.01); *G06F 16/252* (2019.01);
(Continued)

(58) Field of Classification Search
CPC .... G06F 16/26; G06F 16/2423; G06F 16/252; G06N 20/00; G06Q 10/00
See application file for complete search history.

(56) References Cited

U.S. PATENT DOCUMENTS

2007/0234234 A1* 10/2007 Leidig .................. G06F 16/248
715/825
2008/0307301 A1* 12/2008 Decker ............... G06F 16/9577
715/241

(Continued)

OTHER PUBLICATIONS

Tse, Chris, "Card UI Architecture Design, Building Embeddable JavaScript Apps for Web and Mobile Devices," NYC Meteor Meetup, Thoughtworks NYC, Jul. 1, 2014, 121 pages.

(Continued)

*Primary Examiner* — Jeff A Burke
*Assistant Examiner* — Fernando M. Mari
(74) *Attorney, Agent, or Firm* — K&L Gates LLP

(57) ABSTRACT

Embodiments described herein provide enhanced computer- and network-based methods, techniques, and systems for automatically accessing large bodies of potentially disparate data in a compelling environment without the limitations of access provided by spreadsheet systems and in a uniform manner for all types of data. Example embodiments provide an Automated Data Visualization System ("ADVS"), which enables users to access data typically provided by backend systems of organizations in an environment that automatically presents the data using user interface patterns that align with the data. In an example embodiment, the ADVS comprises one or more functional components/modules including an attribute determination logic/engine, a visualization logic/engine, a resizing logic/engine, and a scaling logic/engine in addition to a user interface. Also, in one example embodiment the visualization utilizes a user interface card metaphor to present information.

18 Claims, 26 Drawing Sheets
(20 of 26 Drawing Sheet(s) Filed in Color)

(51) Int. Cl.
  *G06N 20/00* (2019.01)
  *G06F 16/25* (2019.01)
  *G06F 16/242* (2019.01)
  *G06Q 10/06* (2012.01)
  *G09B 29/00* (2006.01)

(52) U.S. Cl.
  CPC ........... *G06N 20/00* (2019.01); *G06Q 10/063* (2013.01); *G09B 29/00* (2013.01)

(56) References Cited

U.S. PATENT DOCUMENTS

| | | | | |
|---|---|---|---|---|
| 2012/0191704 | A1* | 7/2012 | Jones | G06F 3/0484 707/722 |
| 2012/0323933 | A1* | 12/2012 | He | G06Q 10/107 707/749 |
| 2013/0103677 | A1* | 4/2013 | Chakra | G06F 3/04842 707/723 |
| 2014/0129661 | A1* | 5/2014 | Thyagaraja | G06F 9/542 709/207 |
| 2014/0214495 | A1* | 7/2014 | Kutty | G06Q 10/0637 705/7.36 |
| 2014/0365447 | A1* | 12/2014 | Ngo | G01C 21/20 707/687 |
| 2015/0324919 | A1* | 11/2015 | Riggs | G06F 16/285 705/36 R |

OTHER PUBLICATIONS

"List of spreadsheet software," Wikipedia, retrieved from Internet at http://en.wikipedia.org/w/index.php?title=List_of_spreadsheet_software&oldid=656958824 on Apr. 20, 2015, 8 pages.

Tse, Chris, "Patterns of Card UI Design, How to organize cards in containers to deliver insights and drive actions," NYC UX Acrobatics, Amplify DUMBO, Jul. 8, 2014, 117 pages.

"District of Columbia Crimespotting, Month of Dec. 2009" screenshot, Tableau Software, Mar. 19, 2015, 1 page.

"Visual Gallery of Tableau Examples," Tableau Software, retrieved at http://www.tableau.com/learn/gallery on Mar. 19, 2015, 2 pages.

* cited by examiner

AUTOMATED COMPUTER VISUALIZATION AND INTERACTION WITH BIG DATA

CROSS-REFERENCE TO RELATED APPLICATION

This application claims the benefit of priority from U.S. Provisional Patent Application No. 62/287,366 filed on Jan. 26, 2016, which application is incorporated herein by reference in its entirety.

TECHNICAL FIELD

The present disclosure relates to methods, techniques, and systems for visualizing and interacting with data using a computing system and, in particular, to methods, techniques, and systems for automated techniques for engaging users in visualizing and presenting data from very large corpuses of data.

BACKGROUND

Many organizations have copious amounts of data stored as part of their backend systems such as with their financial, personnel, and benefits systems. Each of these backend systems typically utilizes its own applications targeted to its purposes for storing the data and typically provides a set of its own interface for accessing the data be it for administrative or reporting purposes. Sometimes these systems are integrated within an organization for internal use; however, very rarely do these systems seamlessly integrate across organizations to provide uniform interface to relevant data to the external public. This becomes even more important when government initiatives such as open access to government data are embraced. Government organizations such as cities, counties and states have large amounts of backend data stored using a variety of backend systems. When a public person (third party) wants access to the data, a separate system needs to be put in place to access and export the data. One current approach for providing access to the data is to export the data to well-known spreadsheet applications (such as Microsoft's™ Excel) which is laborious at best.

However, as the amount of data becomes extremely large it is not pragmatic or even possible to process and view using spreadsheet programs as many have limitations on the number of "row" and "columns" of data they can process at any one time. Here "row" refers to a data item—such as employee—and "column" refers to an attribute of the data item—such as identification number, hire date, salary, or the like. Currently, in one example popular spreadsheet, this limit is set to 1,048,576 rows by 16,384 columns. This number of data items may be insufficient to process data items from a large government such as a city. Thus, the data must in these cases be distributed across multiple spreadsheets and accessed separately.

Moreover, the interfaces provided to a third party viewer via spreadsheets are limited to the raw, filtered, or sorted data or to the graphs possibly provided by the spreadsheet tools. These interfaces are typically targeted to people with knowledge of the data set and do not provide interesting and engaging ways to access the data they do not necessarily understand. In sum, the interfaces and tools cannot handle extremely large bodies of data (for example, from different backend systems) targeted to the data and do not always provide compelling or interesting ways to view the data.

BRIEF DESCRIPTION OF THE DRAWINGS

The patent or patent application file contains at least one drawing executed in color. Copies of this patent or patent application publication with color drawings will be provided by the Office upon request and payment of the necessary fee.

DETAILED DESCRIPTION

Embodiments described herein provide enhanced computer- and network-based methods, techniques, and systems for automatically accessing large bodies of potentially disparate data in a compelling environment without the limitations of access provided by spreadsheet systems and in a uniform manner for all types of data. Example embodiments provide an Automated Data Visualization System ("ADVS"), which enables users to access data typically provided by backend systems of organizations in an environment that automatically presents the data using user interface patterns that align with the data. This is especially useful in presenting geospatial data which is not traditionally handled in a friendly fashion by current spreadsheets. "Geospatial data" refers to information that identifies the geographic location and characteristics of natural or constructed features and boundaries on the earth, typically represented by points, lines, polygons, and/or complex geographic features associated with locations. For example crimes can be consider geospatial data when locations are associated with them.

In addition, the user interfaces are linked so that changes in viewing filters and scales in one view of the data are automatically triggered and percolated throughout the rest of the data currently being viewed. In particular, the ADVS provides an automated "resizing" mechanism that resizes the particular data display areas being viewed to accommodate user selected emphasis such that viewing of all of the data is still accessible. The ADVS also provides an automated "rescaling" mechanism that rescales and redisplays the data display areas being viewed to accommodate filters that have been selected when the data is too small to be reasonably perceived. These mechanisms (among others) result in providing a more compelling and engaging environment for viewing large amounts of data that would otherwise be cumbersome to view using spreadsheet methods.

Here large amounts of data refers to situations where the data to be displayed is too large to be practically displayed in a spreadsheet for example because it takes too long for the spreadsheet to report a data item or attribute for viewing or because there are too many items to fit in a spreadsheet. Today most spreadsheets can accommodate at most slightly more than 1 million data items (a few open source projects list the ability to handle upwards of that and one program, GS-Calc lists that it can handle 12 million), although is contemplated that the definition of "large" could be bigger or smaller 1 million because to be practically displayed means that the response time for displaying a group of data is perceived as reasonable, typically less than 2 seconds for a user to perceive a response as "instantaneous."

Figure 1:
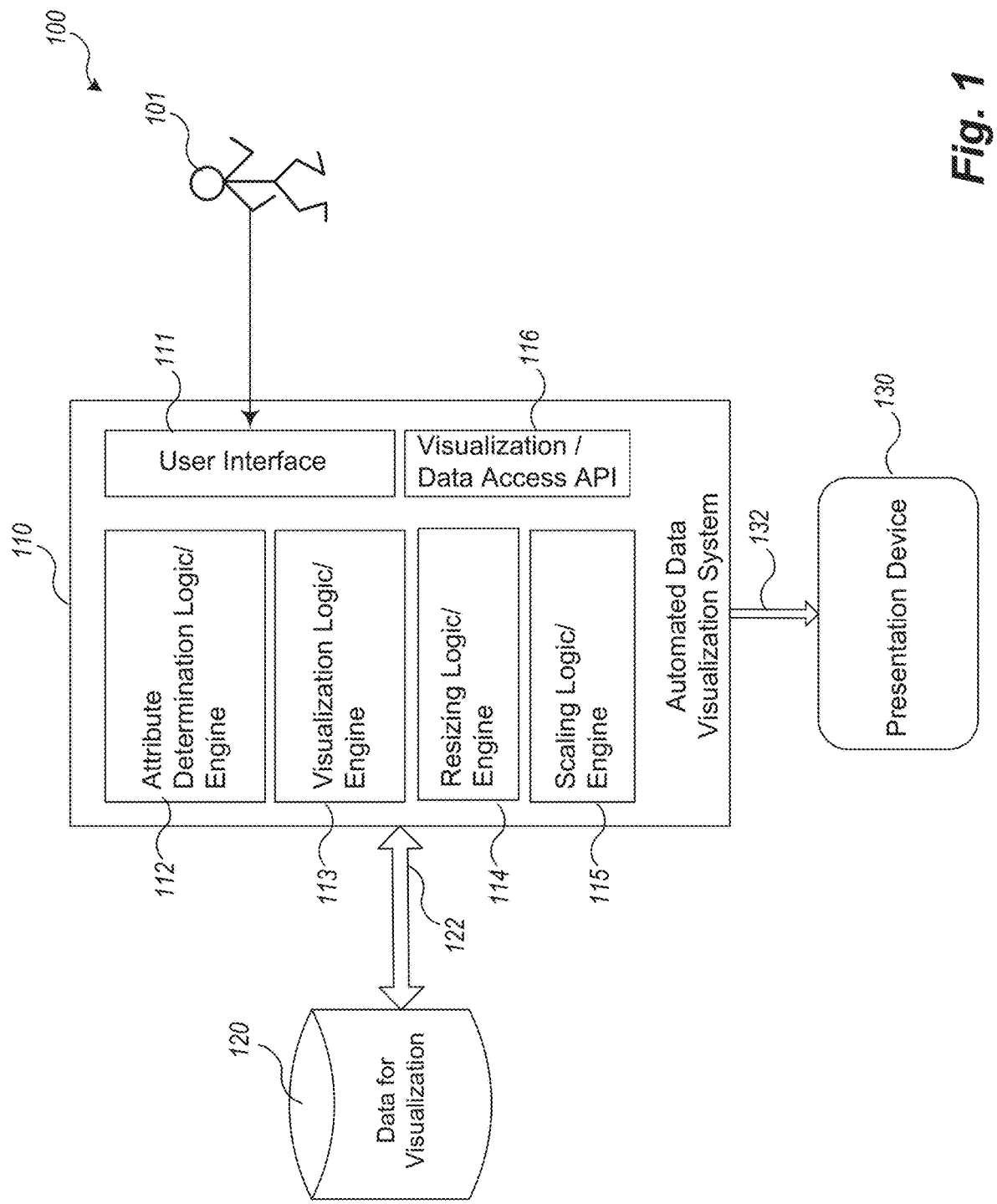
FIG. 1 is a block diagram of an example Automated Data Visualization System and environment.

FIG. 1 is a block diagram of an example Automated Data Visualization System and environment. The Automated Data Visualization System environment 100 comprises data 120, the Automated Data Visualization System (ADVS) 110, a presentation device 130, and a viewer 101. For example, in a typical ADVS environment 100, the data being to be visualized is stored in one or more data visualization repositories 120 and is usually associated with one or more backend systems of one or more organizations as described above (not shown). The ADVS 110 comprises a series of engines or services 112-115 (logic whether implemented in hardware, software, or both) and imports data from the data visualization repositories 120, processes it using the series of engines 112-115, and displays it onto a presentation device 130. User 101 can interact with the ADVS 110 using a user interface 111 or through code accessing the ADVS 110 through an Application Programming Interface (API) 116.

Figure 2:
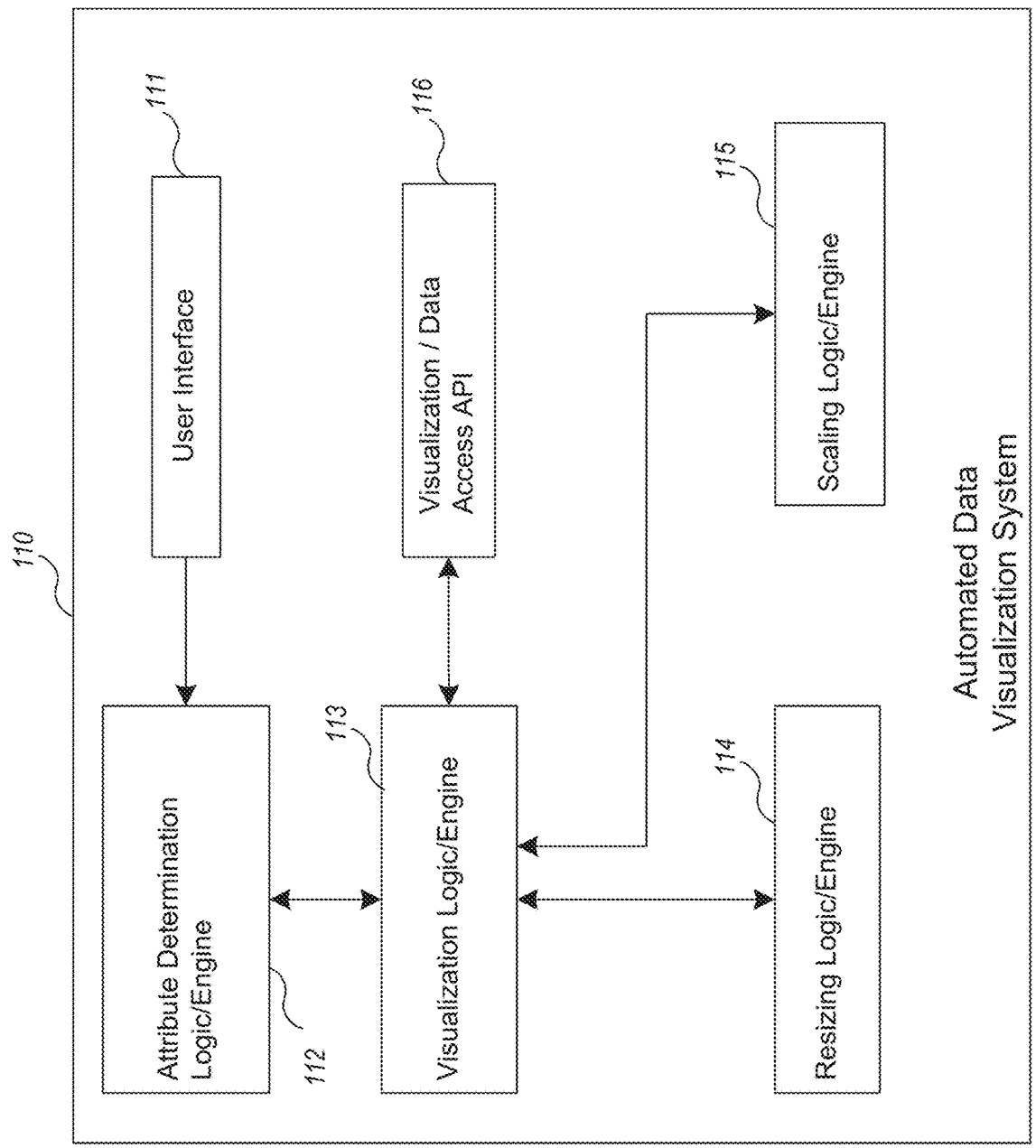
FIG. 2 is an example block diagram of components of an example Automated Data Visualization System.

FIG. 2 is an example block diagram of components of an example Automated Data Visualization System. In an example embodiment, the ADVS comprises one or more functional components/modules that work together to process and display data from the data visualization repositories 120 to present. For example, the ADVS 110 may comprise an attribute determination logic/engine 112, a visualization logic/engine 113, a resizing logic/engine 114, and a scaling logic/engine 115. In one or more embodiments, one or more of these logic/engines 112-115 may or may not be present. In addition, the logic/engine 112-115 may be implemented in a distributed fashion on one or more computing systems that intercommunicate as described according to FIG. 7.

In a typical viewing scenario, the user 101 selects the data to be visualized using user interface 111 or by programmatic means. In response, the attribute determination logic/engine 112 determines which attributes of the data are to be visualized, for example, which "columns" of data tables are to be accessed. Attributes may be simple values such as text or string data, or may be more complex and indicative of and representable as latitude/longitude values, or may be aggregations of other data values.

Once the ADVS determines the appropriate attributes (hence their associated data values) to display, these are input into the visualization logic/engine 113 for processing. Here, according to example embodiments, the ADVS determines (figures out, computes, looks up, etc.) automatically which user interface pattern to use to display a particular attribute for the set of data items being displayed. In example embodiments of an ADVS 110, user interface (UI) "cards" or "card decks" are used to achieve automatic visualization of selected data items and attributes. UI cards, including their implementation, are described in detail in various articles, such as for example, in Tse, Chris, "Card UI Architecture Design," presentation Jul. 1, 2014 in NYC, available at https://speakerd.s3.amazonaws.com/presentations/c8eb6710e43c0131e3ad6ac4dbaea8fd/Card_UI_Architecture_Design_Deck.pdf. They can be used to aggregate all kinds of data, take into account a simple metaphor known in the real world, and are amenable to presentation on different size devices such as mobile devices. The cards used and data types presented in automatically constructed visualizations by example ADVS embodiments are described with reference to FIGS. 3A-3H described below.

Once the ADVS 110 decides and creates a visualization of determined data, the ADVS 110 then presents the data on a presentation device such as device 130. The presentation device may be any device for presentation including an audio device, a display on a computing device (personal computer, tablet, mobile, or otherwise), or a virtual device programmed to present the data to a user. In a current embodiment of the ADVS presentation, the layout is organized according to a determined number of rows and columns of cards, although this is modifiable in some embodiments. When a user 101 selects a particular card to "enlarge," the resizing logic/engine 114 will resize all of the remaining cards effectively to maintain a user's ability to still view all of the cards. One embodiment of resizing performed by the resizing logic/engine 114 is described below with reference to FIGS. 4A-4E and 8A-8B. Other resizing algorithms may be similarly incorporated into the resizing logic/engine 114.

In addition, a user 101 can filter data or otherwise cause data of a data set to be displayed in a manner in one card that causes the data in corresponding cards to become too small (or sparse) to view. In this case, in some embodiments, when set to "automatic scaling mode," the ADVS 110 automatically resizes the columns in the other corresponding cards such that the data is more able to be viewed. One embodiment of rescaling performed by the rescaling logic/engine 115 is described below with reference to FIGS. 5A-5E and 9. Other rescaling algorithms may be similarly incorporated into the rescaling logic/engine 115.

Other capabilities of the ADVS 110 are available such as selection of the attributes of a data set to be viewed, what values or value ranges to filter in or out of a visualizations, and what values or value ranges to use to sort and present the data.

Figure 3A:
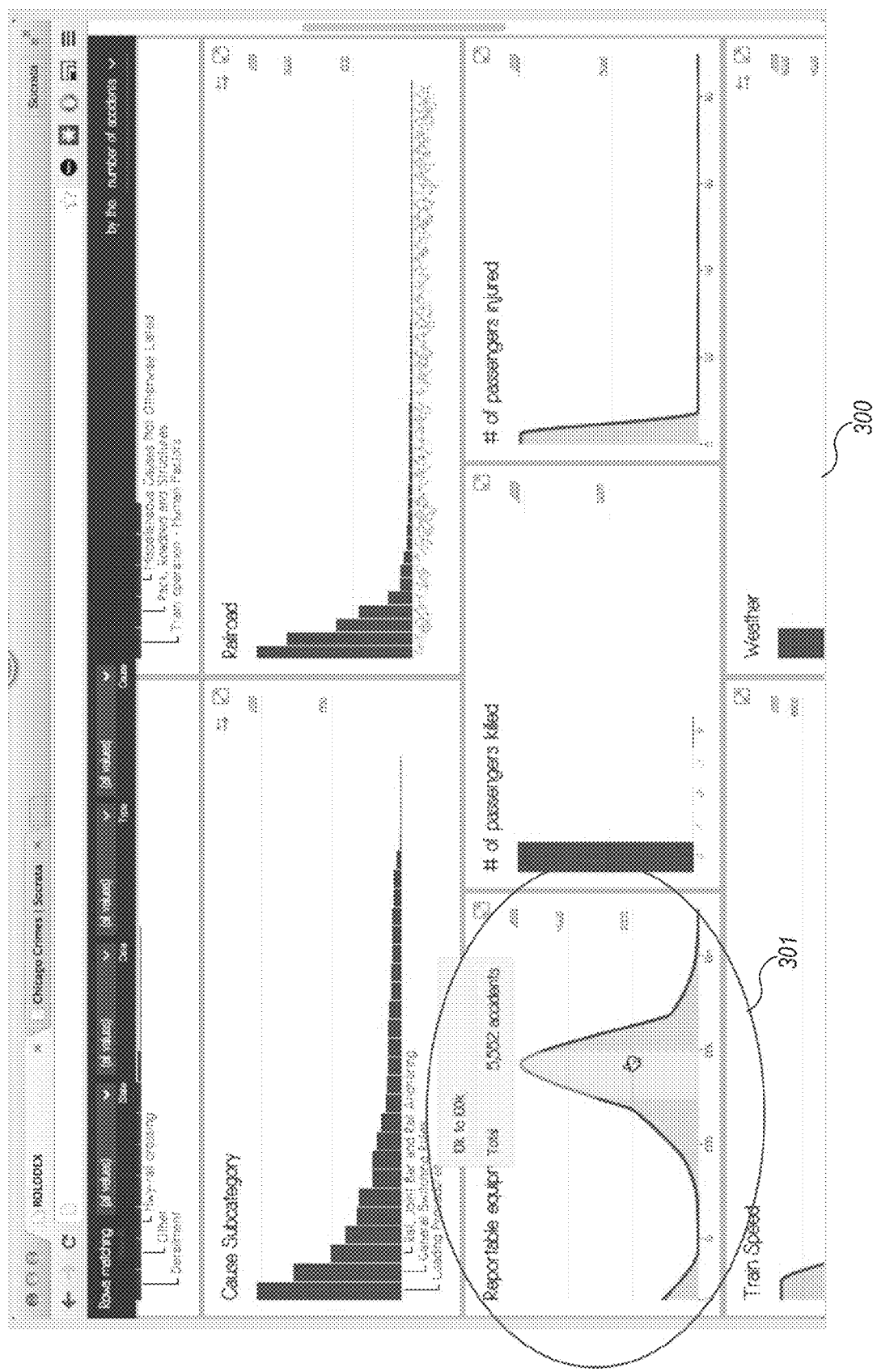
FIGS. 3A-3I are example screen displays of different types of visualizations available with an example Automated Data Visualization System.

FIGS. 3A-3H are example screen displays of different types of visualizations available with an example Automated Data Visualization System. As described, the visualizations are created using a user interface card metaphor. Based upon the type of data to be displayed, the Automated Data Visualization System automatically chooses a card type for displaying the data that is the "best fit" to the data to be viewed. FIGS. 3A-3F illustrate a set of cards used to visualize a data set for visualizing train accidents. FIG. 3A shows an example of a histogram chart displayed as a UI card 301 within web page 300 illustrating the "reportable equipment damage in $." As seen from the histogram, the dollar ranges for 5,552 accidents ranges from about 10K to 100K and peaks at slightly less than 100K. The visual shows instant information of the data. Other histograms that can be seen partially in this same data set on web page 300 including a card for the number of passengers injured and a card for train speed.

Figure 3B:
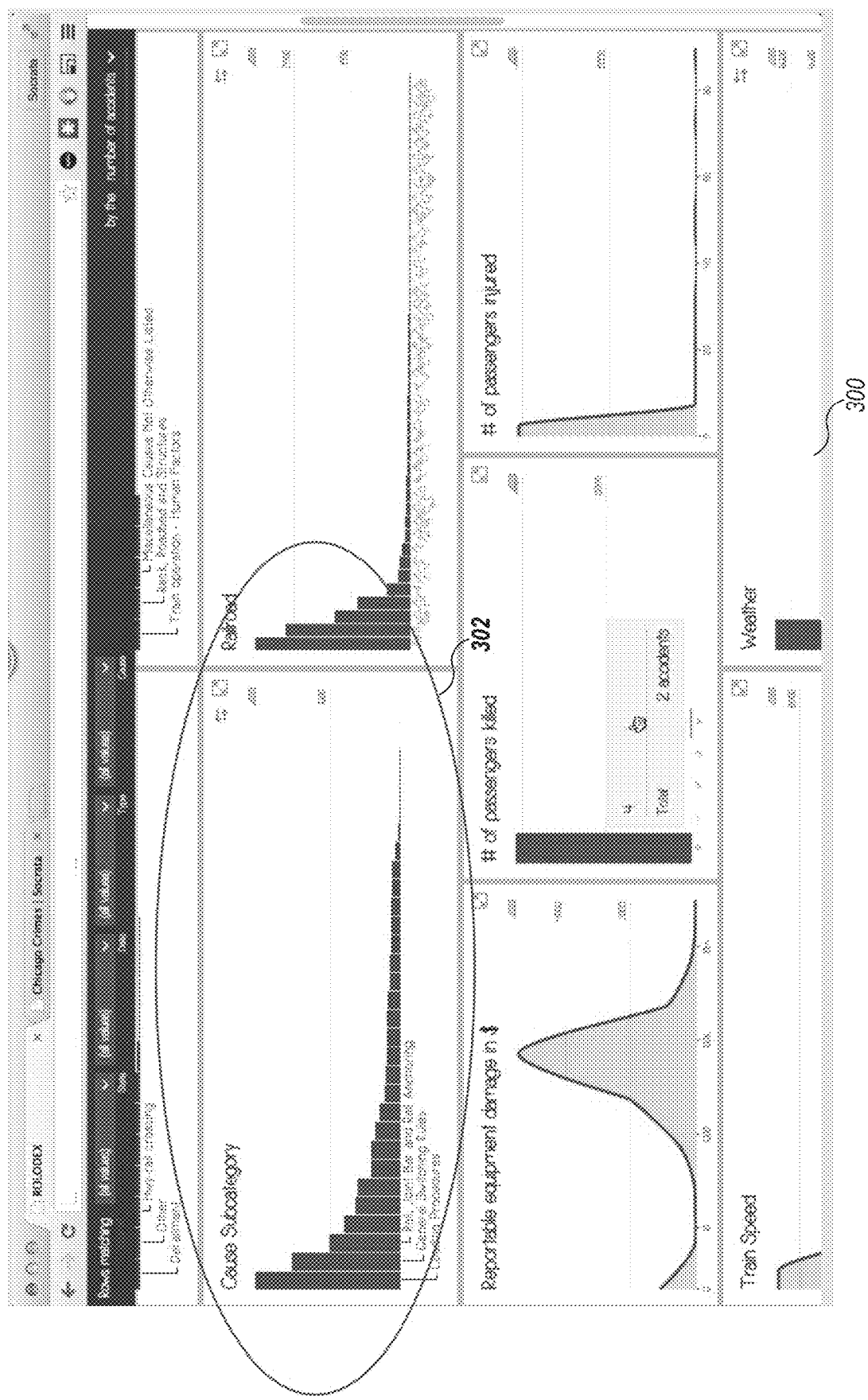

FIG. 3B shows an example of a bar chart displayed as a UI card 302 within partially displayed web page 300 illustrating the "cause subcategory" for accidents. As seen from the bar chart, the data sorted by amount shoes that "loading procedures" were the highest subcategory of accidents, followed by "general switching rules," followed by "rail, joint bar and rail anchoring." The other subcategories are too small to be presented and, to see them, the card can be rescaled as described below. Other bar charts visible on the portion of the web page 300 shown include the railroad where the accident occurred, the number of passengers killed, and the weather.

Figure 3C:
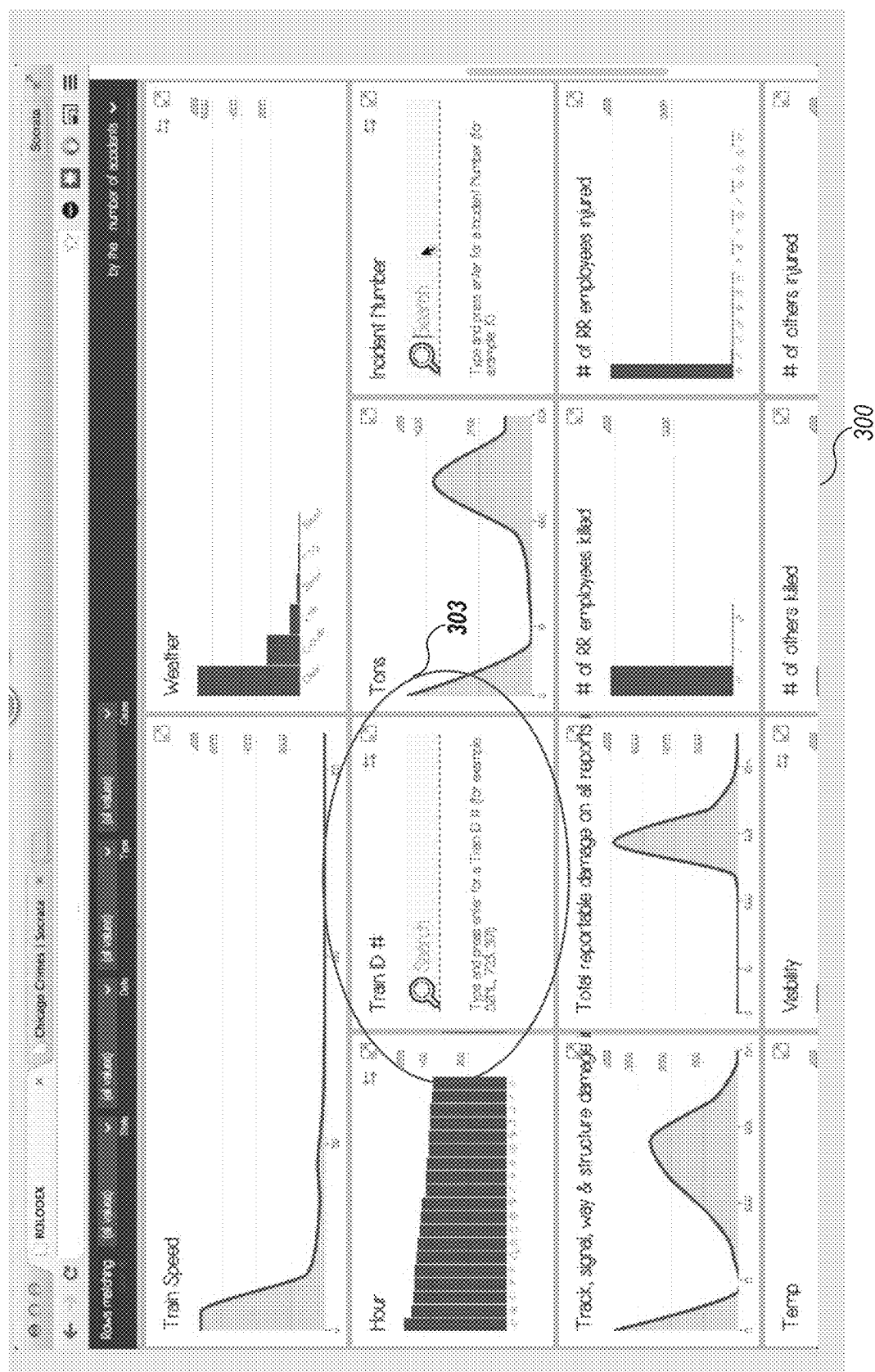

FIG. 3C illustrates an example of a search box for display of text data such as the "train identifier" within UI card 303 within partially displayed web page 300. The user types in a text term to match potential train identifier, and the ADVS displays the corresponding matching identifiers. Upon selection of a particular train identifier (which acts as a filter), the remaining cards update their data to show data for that corresponding train identifier. A search box UI card such as card 303 is typically used when the number of choices is above a particular threshold. In some embodiments this is a settable parameter in the system.

Figure 3D:
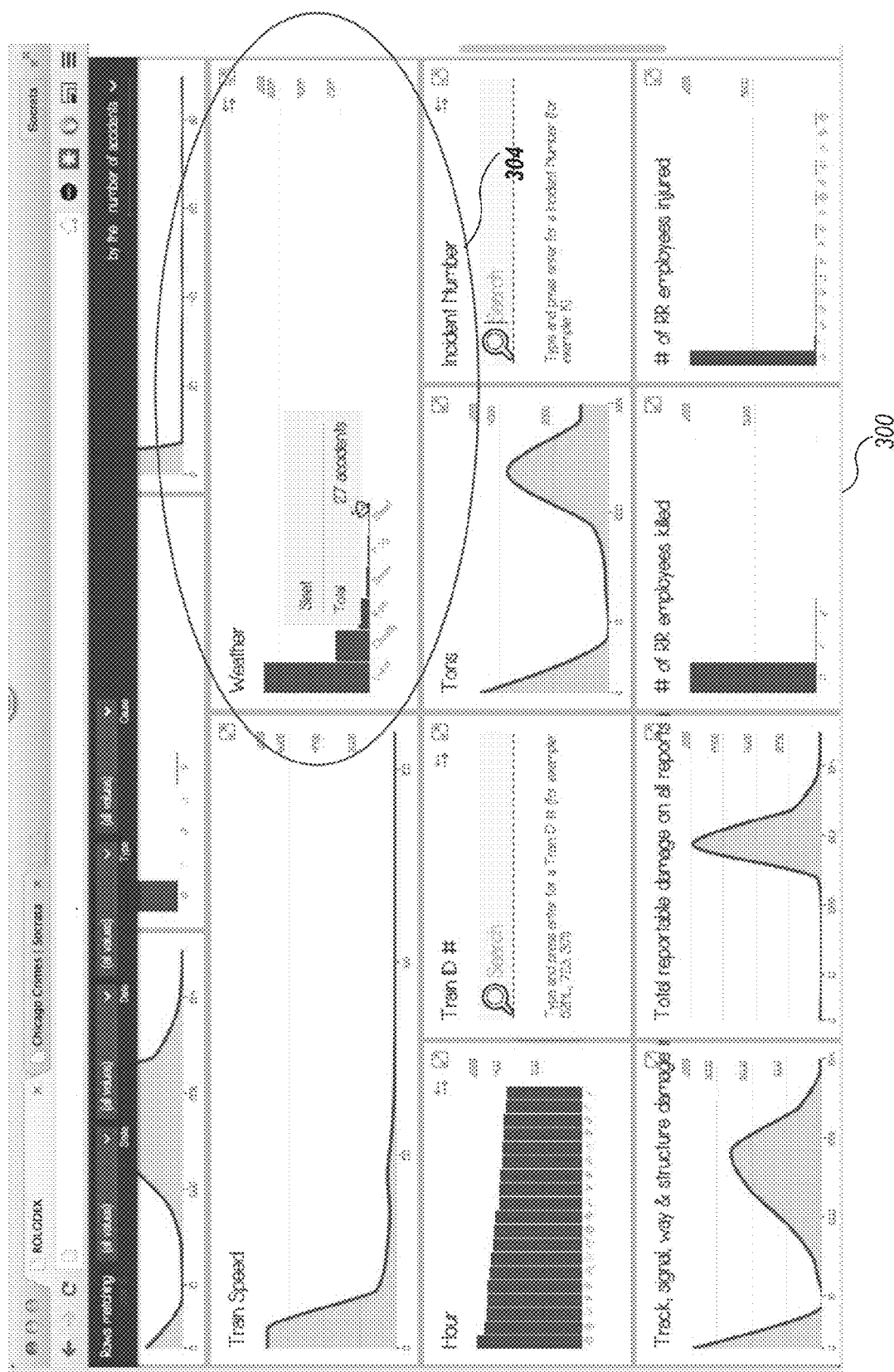
Figure 3E:
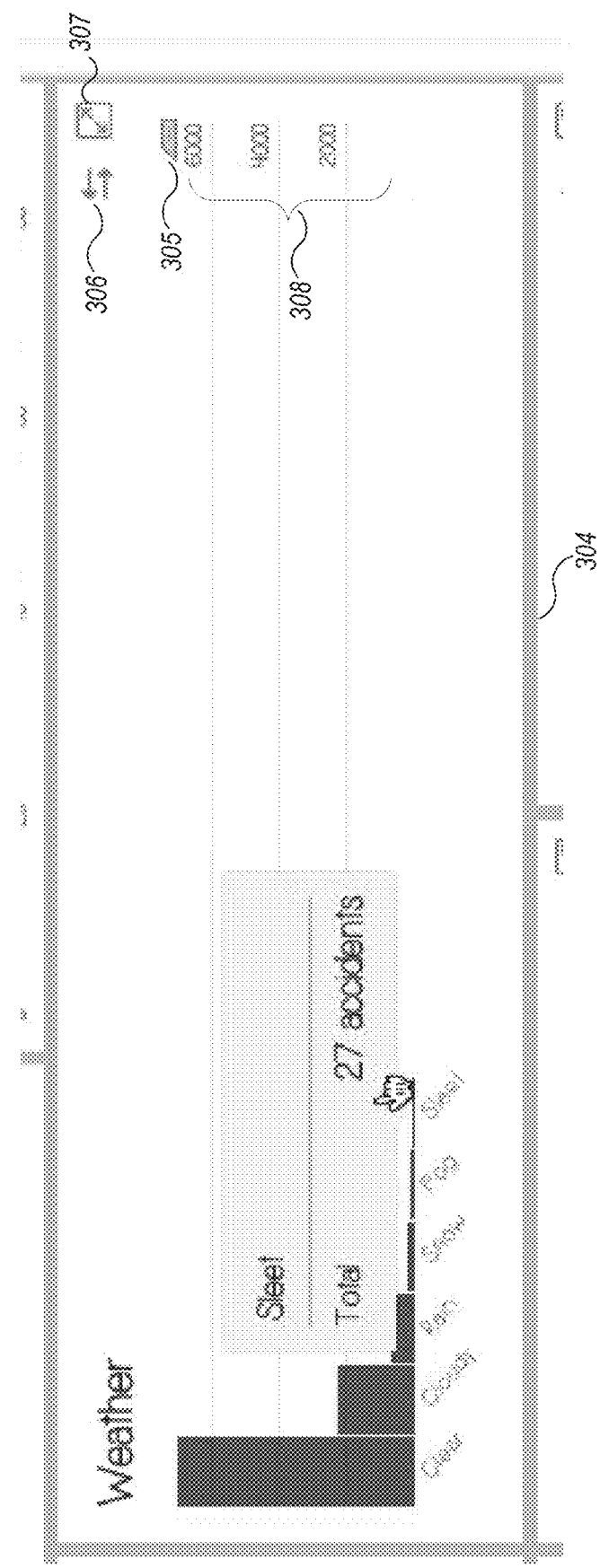

FIG. 3D shows another example of a bar chart displayed as a UI card 304 within partially displayed web page 300 illustrating the "weather" for accidents. FIG. 3E is a close up of the weather UI card 304. As can be seen from on the right hand side the y-axis scale 308, which reflects the cardinality of each value (type) for the attribute "weather" for the data items is shown in increments of 2,000. In the example displayed, the type "sleet" for weather attribute of all of the accidents recorded has a cardinality (representing occurrence) of 27. Yet the cardinality of the attribute type "clear," which is largest over all accidents, is over 6000. Because there are at least two extreme values—both outside the current scale—the UI card 304 is not effectively display the smaller value the same time as the larger value. To address this within the ADVS, the user can either manually reset the scale by moving handle 305, or the ADVS can be placed in automatic recalling mode by selecting a tools icon (not shown) and selecting automatic mode for some of all of the cards. In manual mode, the user can be in control of the scale of the attribute being displayed for example to compromise between an attribute type with a very large value and one with a very small value. In automatic mode applied to all cards, the ADVS will automatically rescale the y-axis of UI card 304 or the other cards being displayed in web page 300 such that the smaller values can be reflected without the user really needing to understand the data or the display algorithms.

Icon 306 is used to select sort options such as by amount (as filtered) or alphabetically. Icon 307 is used to enlarge the UI card to a size determined automatically by the ADVS. This resizing is described below.

Figure 3F:
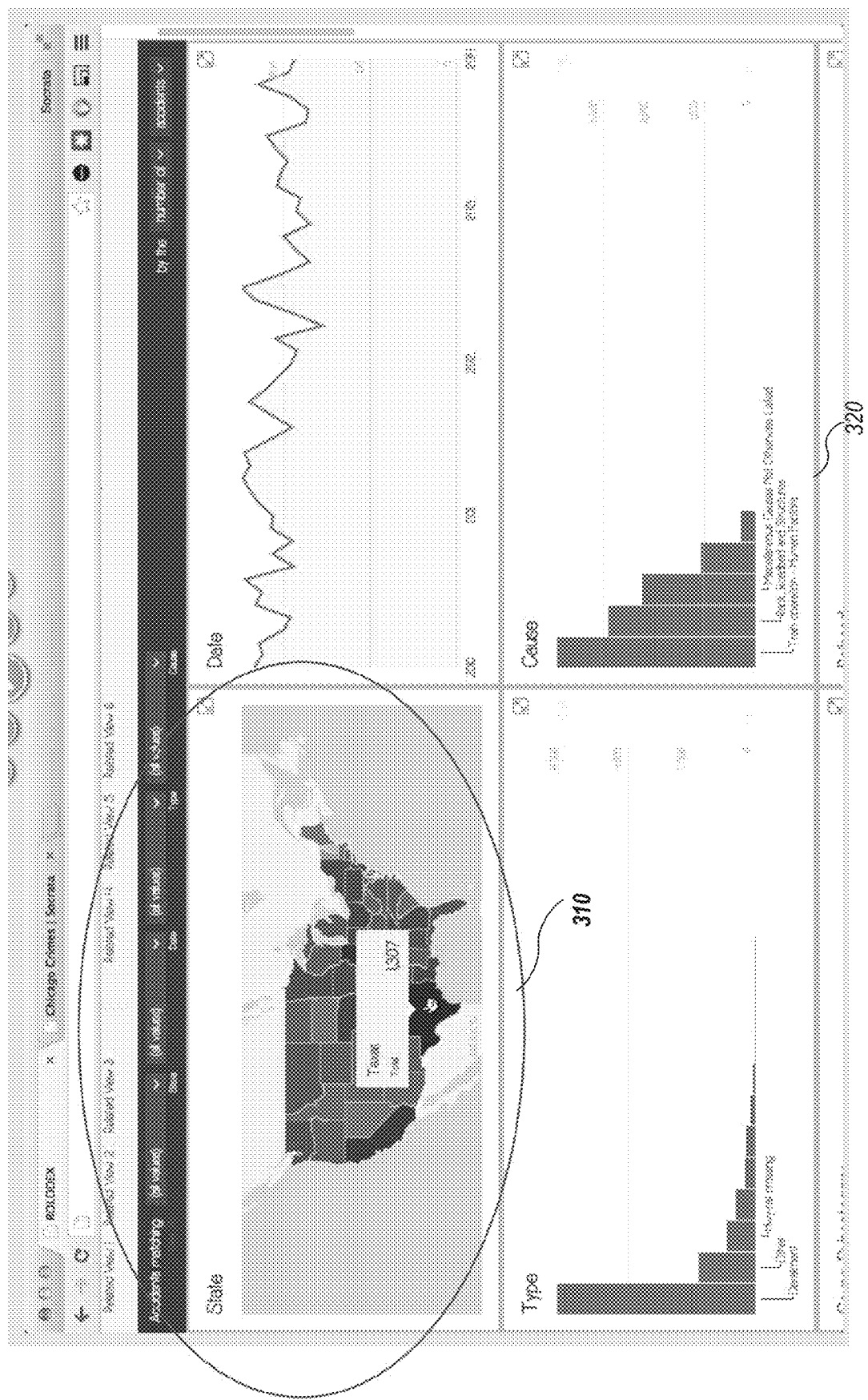

FIG. 3F is an example of a mapping UI card used to visualize data with a latitude-longitude component such as another way to visualize the number of train accidents per state. As shown by card 310 on partially shown web page 300, the user has hovered a cursor over a map, here on state Texas, and the corresponding number of train accidents are shown.

Figure 3G:
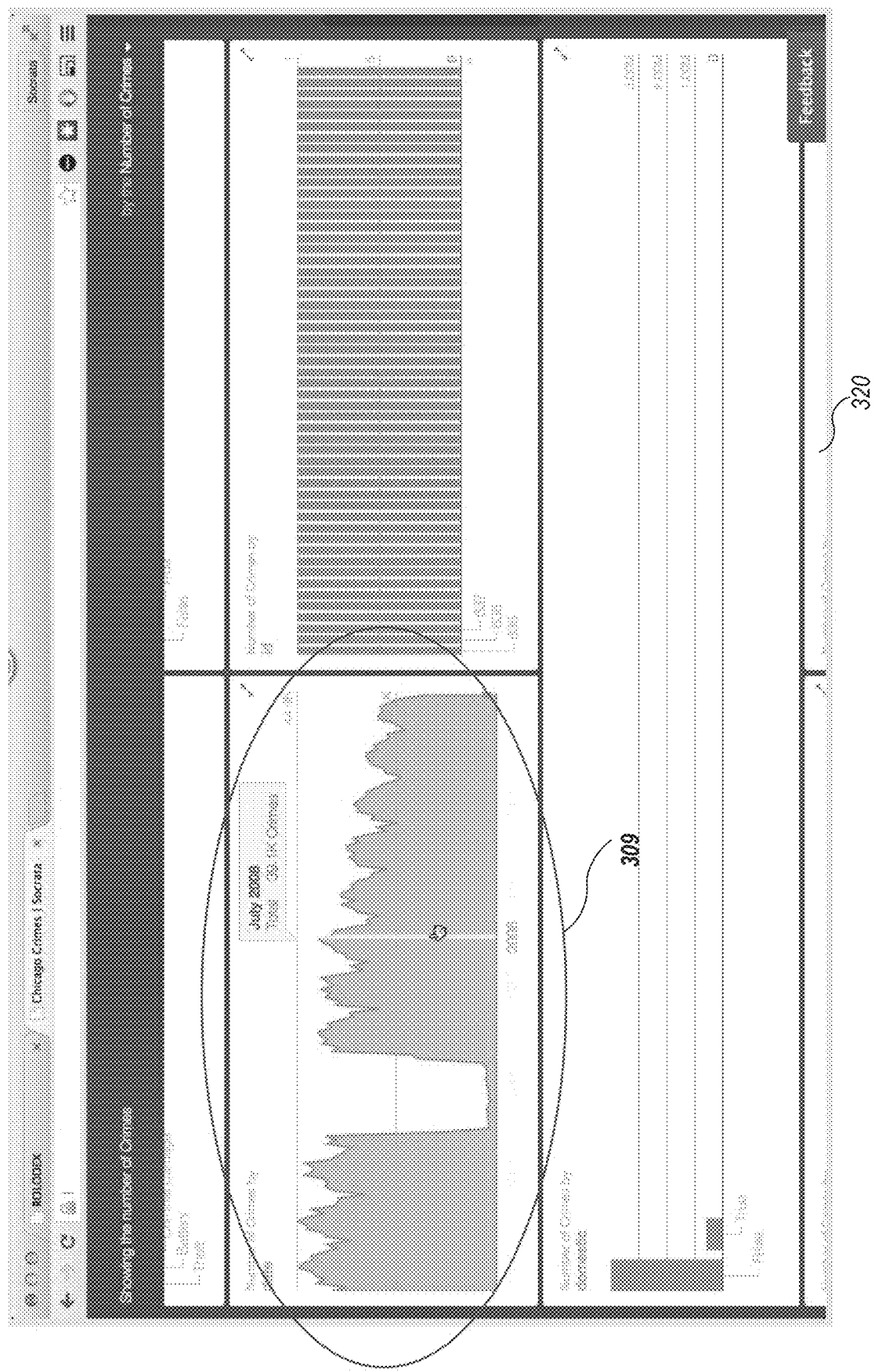
Figure 3H:
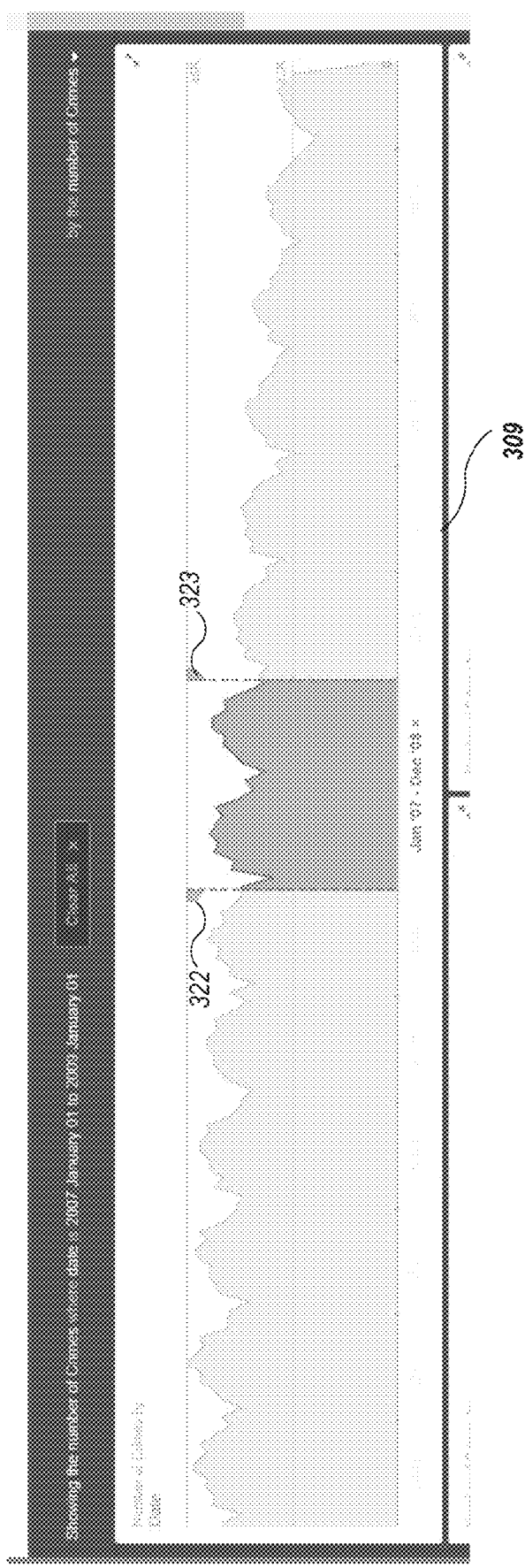
Figure 3I:

FIGS. 3G-3I illustrate a set of UI cards used to visualize a data set for visualizing crime in the city of Chicago. FIG. 3G shows an example of a date formatted UI card 309 within web page 320 illustrating the "number of crimes by date." Date card 309 is a type of histogram with a selectable "bar" that presents handles that can be moved to select a single date or a date range. This user selectable range is shown in FIG. 3H. So, for example, if the user only wished to display the crime information from 2007 to 2008, the user could select and indicate the range of 2007-2008 between selection handle 322 and selection handle 323 in FIG. 3H. Once a range is selected, it acts as a filter for the visualized data and the other cards are updated to reflect data that corresponds to the filtered date range.

FIG. 3I shows an example of a map in UI card 311 with different colors representing the different number of crimes in different community areas in the city of Chicago. A key scale to the colors is shown on the right hand side. Sometimes this type of map is referred to as a heat map. This type of UI card may be used to represent any type of data with latitude, longitude values.

The cards illustrate that some UI cards can act as filters for the rest of the cards being displayed (such as the date UI card shown in FIG. 3G) whereas other cards show output dependent upon the filters set by other cards. Also, as demonstrated from the UI cards described with reference to FIGS. 3A-3I, depending upon the type of attribute of the data that is determined to be displayed in a card, the ADVS can automatically choose and display a corresponding card. In some instances there is more than one card that may be used to illustrate the data and the ADVS can choose a default or by some other analysis of what is being already displayed. For example, the ADVS can choose to display all of the same UI cards whenever feasible (to minimize the types of UI cards being displayed) or can intentionally vary the UI cards whenever possible. Other algorithms can be used.

Figure 4A:
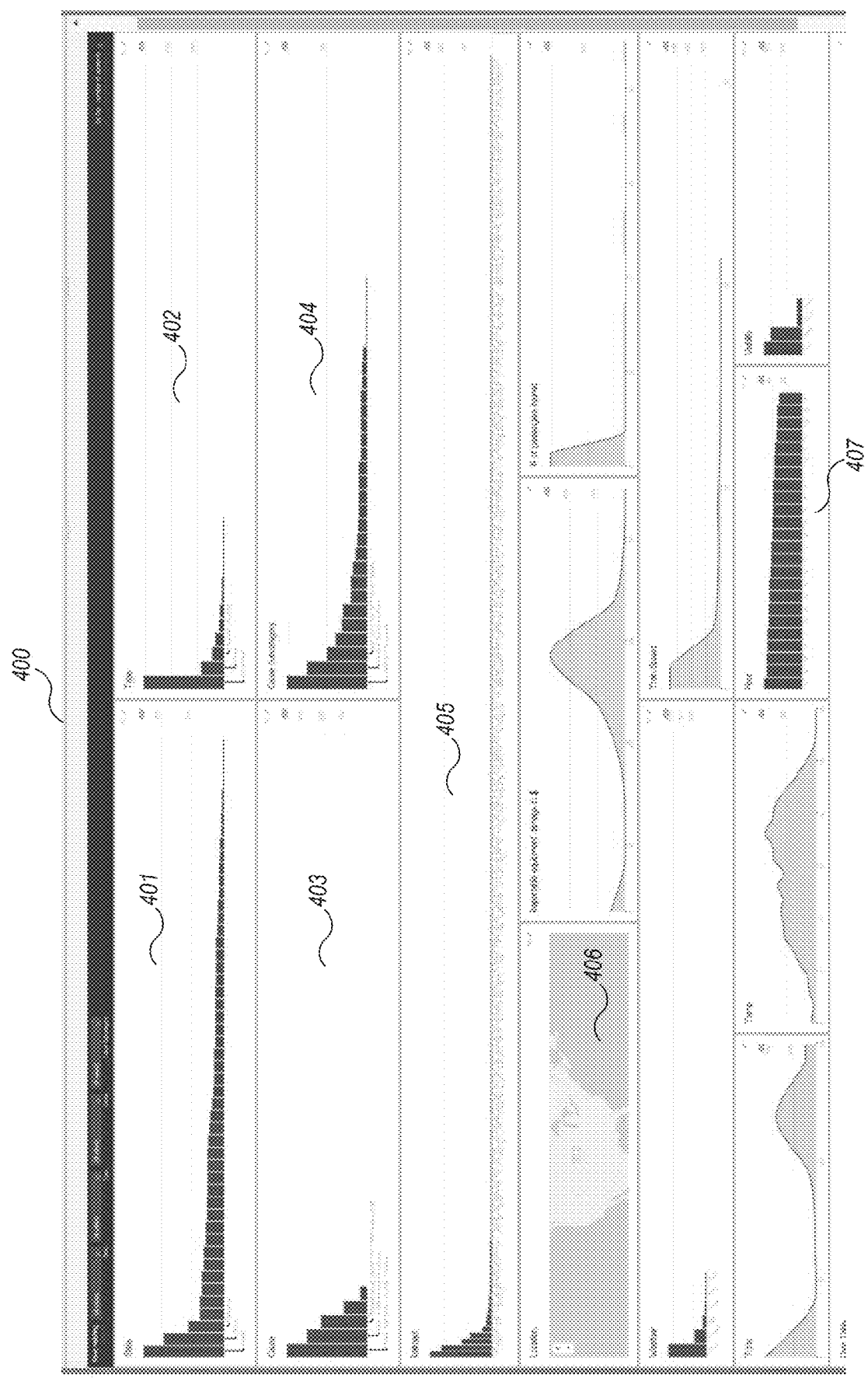
FIGS. 4A-4E are example screen displays illustrating automatic resizing functionality available using an example Automated Data Visualization System.

FIGS. 4A-4E are example screen displays illustrating automatic resizing functionality available using an example Automated Data Visualization System. FIGS. 4A-4E represents a sequence showing how an example ADVS resizes a set of UI cards visualizing a data set according to a "preset" grid of 3 possible columns to maximize the number of cards visible on a page at any one time. In FIG. 4A, the ADVS displays a visualization of 14 different UI cards that are automatically selected by the ADVS. UI cards 401, 403, 405, 406, etc. are placed in different "rows" on the presentation device and, as can be observed, the cards may occupy different heights. This is determined by the ADVS based upon attributes of the cards to be displayed such as the range of x-values of a bar chart or histogram and the range of y-values for the cardinality of the type of attribute presented in the cards. Other factors may be taken into account and/or other heuristics used to place the cards on the display grid. In one embodiment, the height of the various UI cards, for example cards 401-404, is determined based upon the range occupied by the data. So, for example, the "state" UI card 401 and "type" of railroad accident UI card 402, cause UI card 403, and cause subcategory UI card 404 are placed at the stop to begin with because their y-values (cardinality) spans a greater range than for some of the other UI cards. In contrast, the y-values of the "hour" of accident bar chart in UI card 407 are very similar so less row height is needed.

Figure 4B:
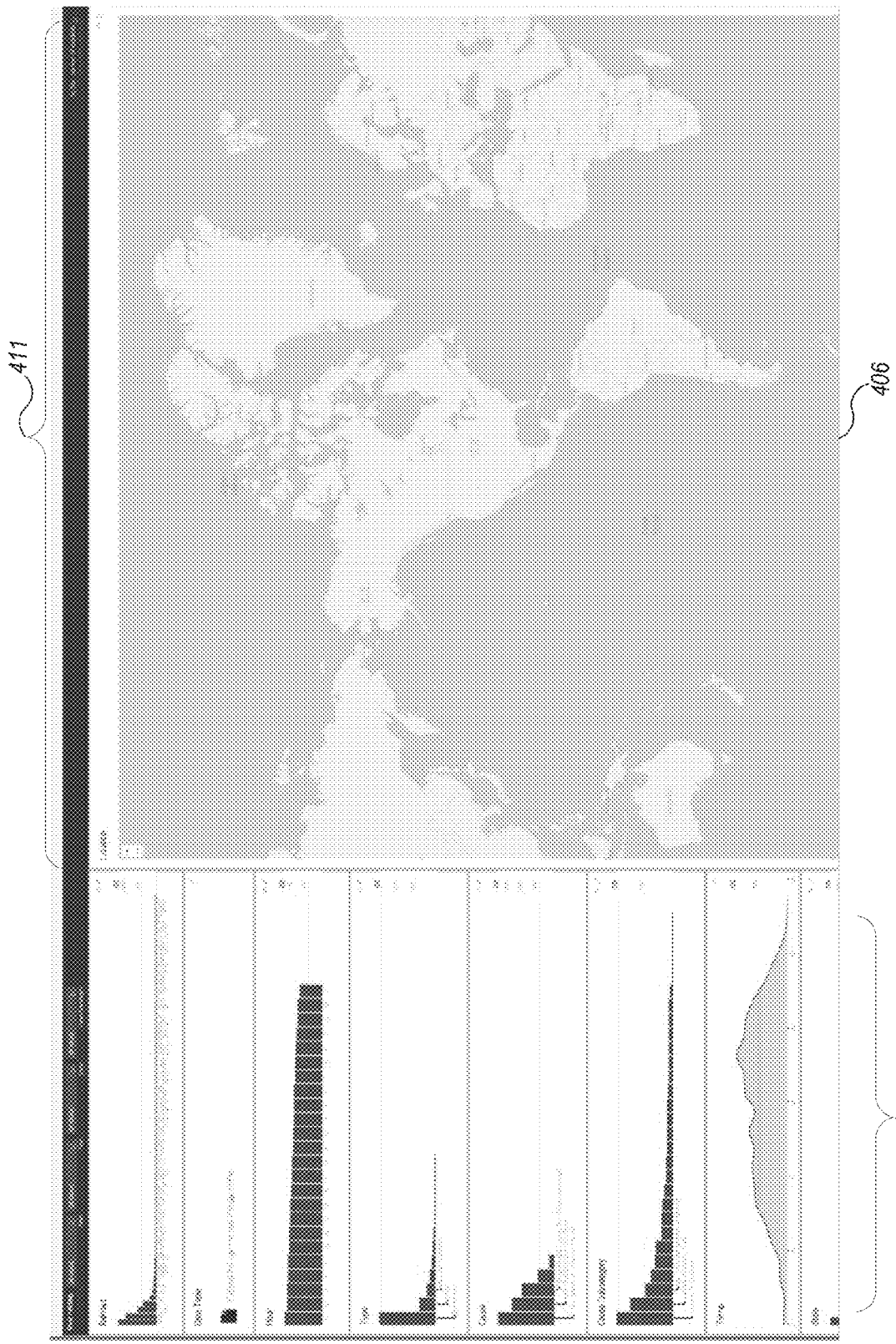

In FIG. 4B, the user has selected the "enlarge" icon of the map UI card 406 to enlarge the map. One mechanism for enlarging the map was described with reference to FIG. 3E, icon 307. When it has been indicated that a UI card is to be enlarged, the ADVS follows a resize algorithm to place as many enlarged UI cards as indicated in the real estate of the display area that covers columns 2 and 3 of the display grid, enlarged area 411. So, for example, in a grid of 3 columns, the first enlarged UI card, here card 406 is enlarged to occupy all of what would be columns 2 and 3 of the display area 400. The remaining cards are places in rows of the first column 410 and can be scrolled to access if needed. In some embodiments the user can rearranged the UI cards. FIGS. 4A-4E show automated resizing performed to enable the user to maximize the content of choice while continuing to view the remaining data of the data set in a less prominent positions.

Figure 4C:

In FIG. 4C, the user has selected the "enlarge" icon of the "hour" UI card 407 to enlarge card 407. Now the display area for enlarged UI cards (columns 2 and 3 in this embodiment) is shared between the two enlarged UI cards map UI card 406 and bar chart UI card 407 by splitting the display area for enlarged UI cards 412 horizontally to maximize the real estate for showing the data content. The first column 410 continues to be used to display the remaining UI cards.

Figure 4D:
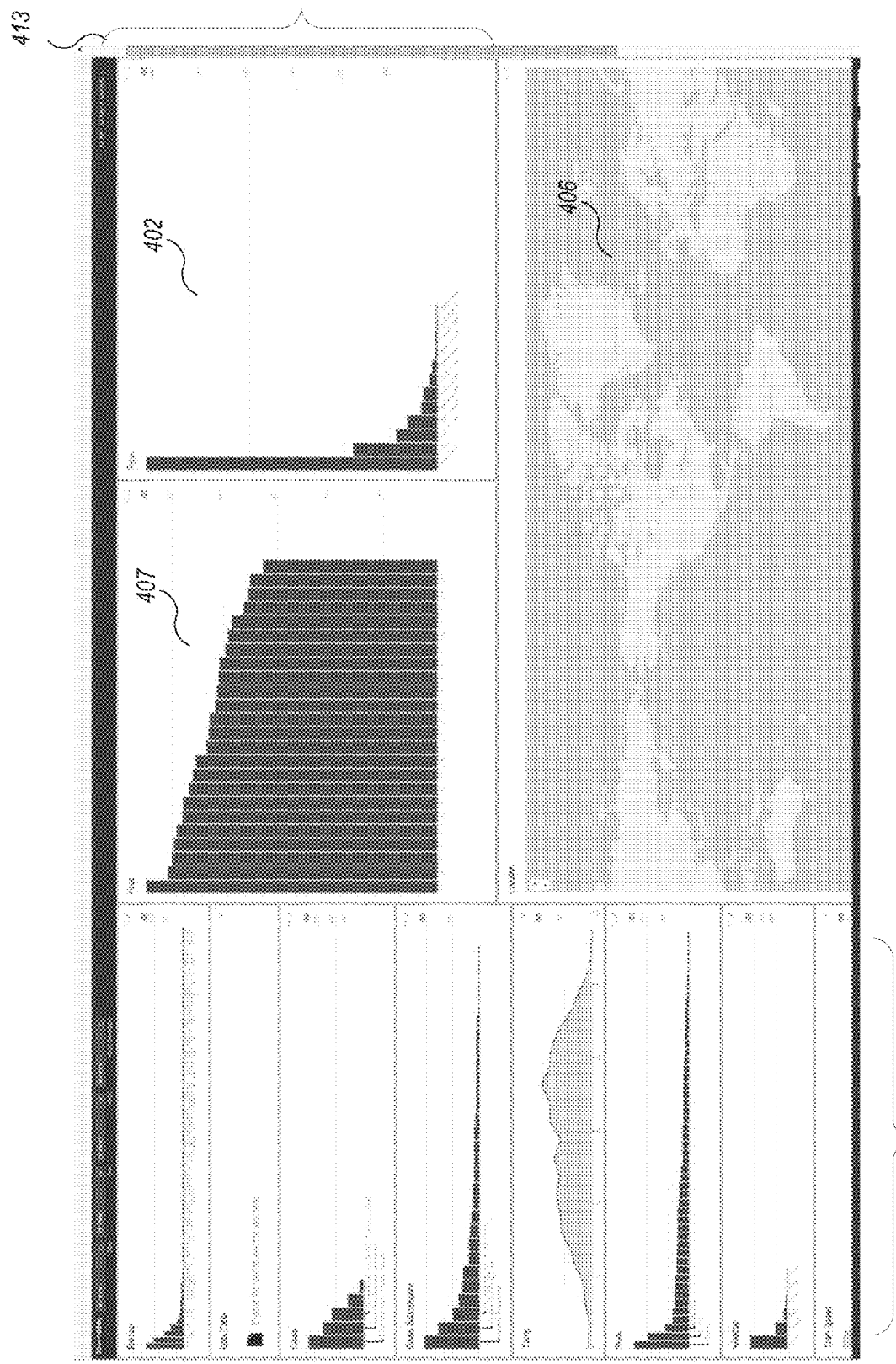

In FIG. 4D, the user has selected the "enlarge" icon of the "type" UI card 402 to enlarge card 402. Now the display area for enlarged UI cards (columns 2 and 3 in this embodiment) is shared between the three enlarged UI cards including map UI card 406, bar chart UI card 407, and bar chart UI card 402 by splitting a portion of the display area for enlarged UI cards 413 vertically. In this case the ADVS chooses to devote the larger portion of the display area for enlarged cards to the map UI card 406, although other arrangements are possible. The first column 410 continues to be used to display the remaining UI cards.

Figure 4E:
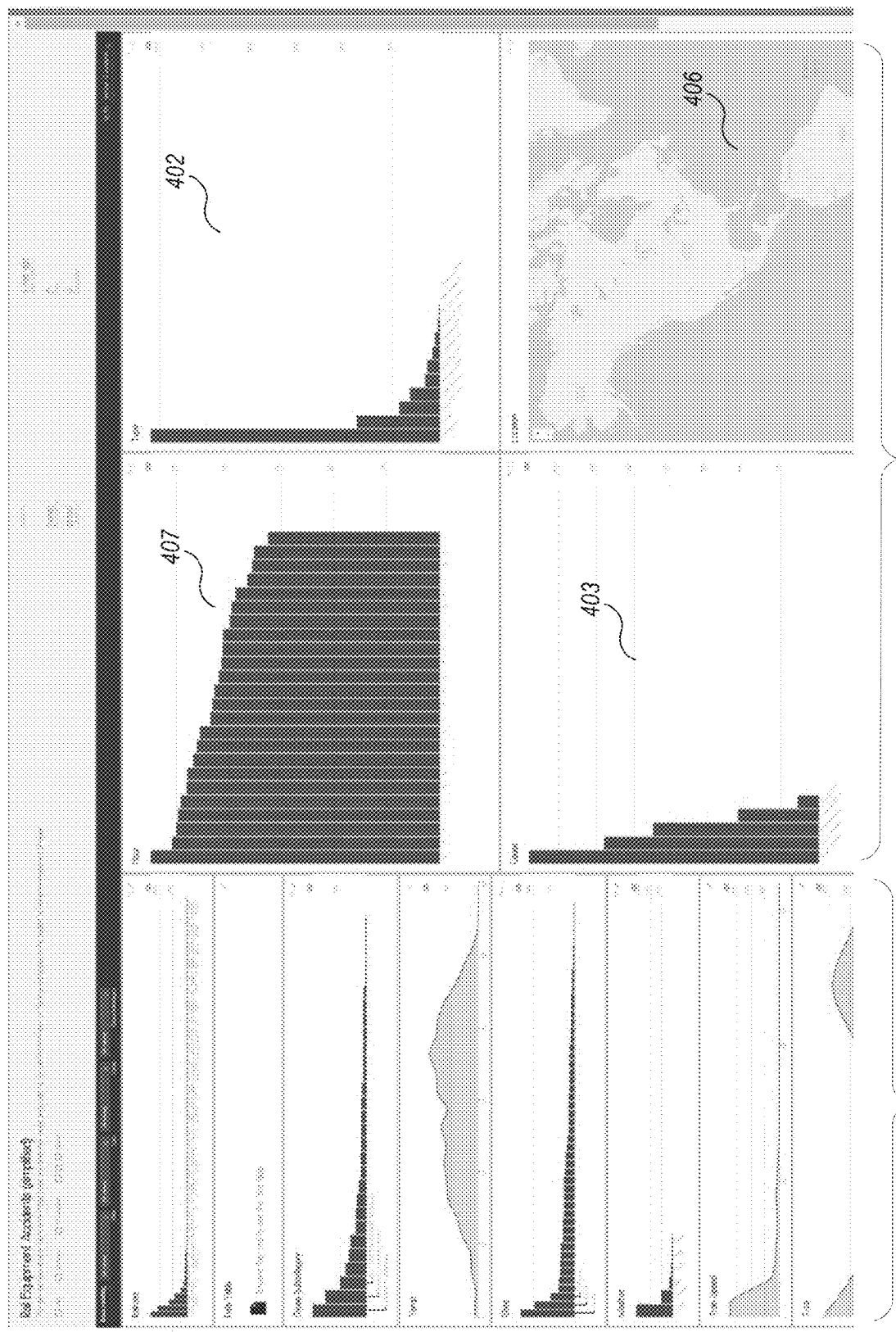

In FIG. 4E, the user has selected the "enlarge" icon of the "cause" UI card 403 to enlarge card 403. Now the display area for enlarged UI cards (columns 2 and 3 in this embodiment) is shared between the four enlarged UI cards including map UI card 406, bar chart UI card 407, bar chart UI card 402, and bar chart UI card 403 by splitting the display area for enlarged UI cards 414 vertically and horizontally to give each UI card a similar portion of the display area for enlarged cards 414. The first column 410 continues to be used to display the remaining UI cards.

In some embodiments, the ADVS limits the number of enlarged cards in a 3 column grid to four. In other embodiments the ADVS continues to split the display area for enlarged cards 414 as indicated by the user. In the latter case, the display area for enlarged cards 414 could end up containing more UI cards than the remaining UI cards shown in the first column 410.

Automated resizing of the other cards by the ADVS predicts what the user intends by enlarging certain UI cards yet leaving the others alone. This respects a user's choice to emphasize certain content yet maximize the ability for all content to be displayed at once.

FIGS. 5A-5E are example screen displays illustrating automatic rescaling functionality available using an example Automated Data Visualization System. The problems associated with displaying data of different ranges were described with reference to FIGS. 3D and 3E. To recall, a user can set up rescaling to be manual, automatic, and whether to apply the setting to all cards using the "handle" icon shown in FIG. 3E.

Figure 5A:
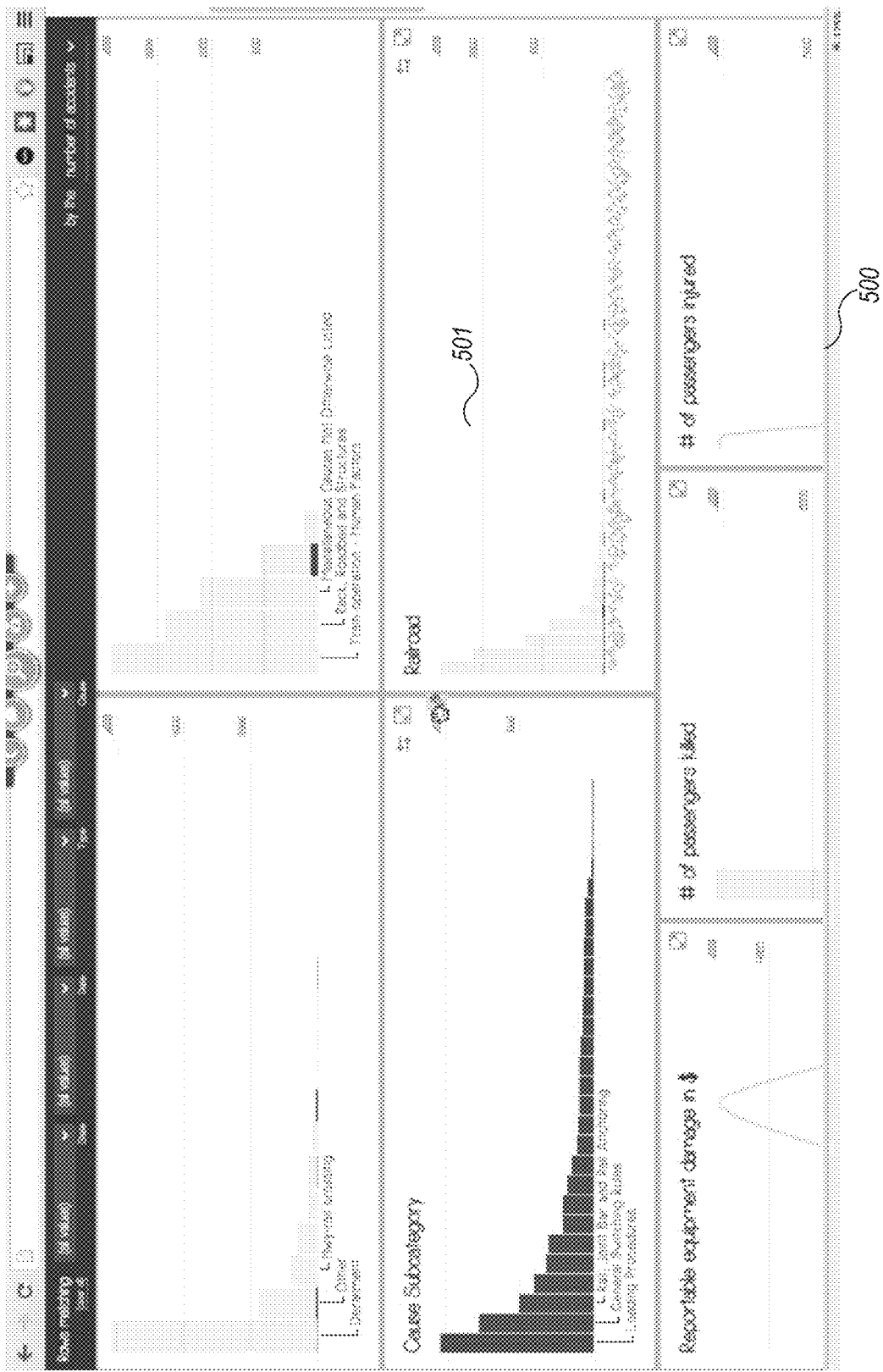
FIGS. 5A-5E are example screen displays illustrating automatic rescaling functionality available using an example Automated Data Visualization System.

In FIG. 5A, a layout of UI cards for visualization of the railroad accident data is shown on web page 500. As observable from UI card 501, it is impossible for a reader to read the different railroads where accidents have occurred because the scale is set to too high a range of values to detect smaller numbers of accidents.

Figure 5B:
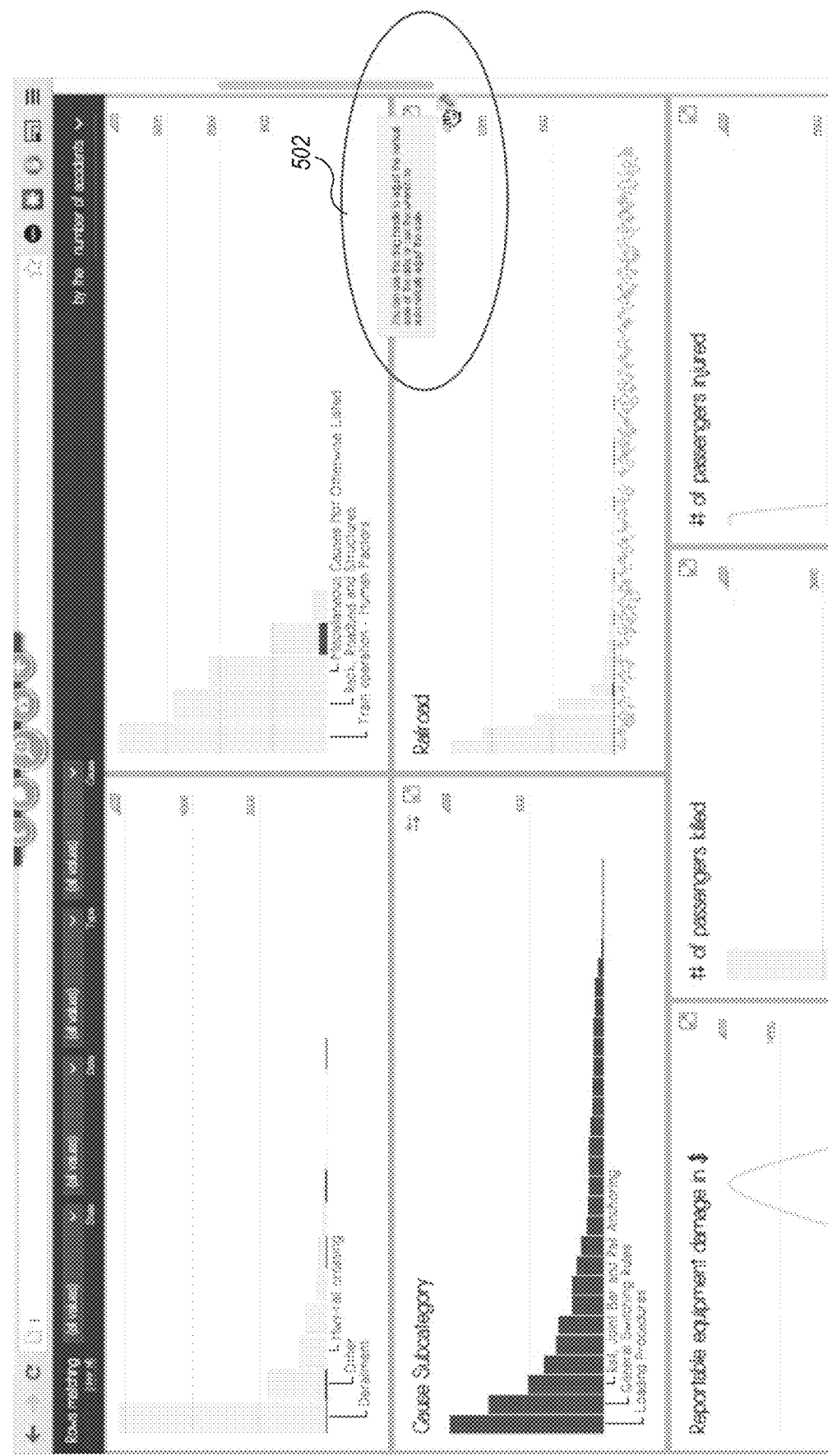
Figure 5C:
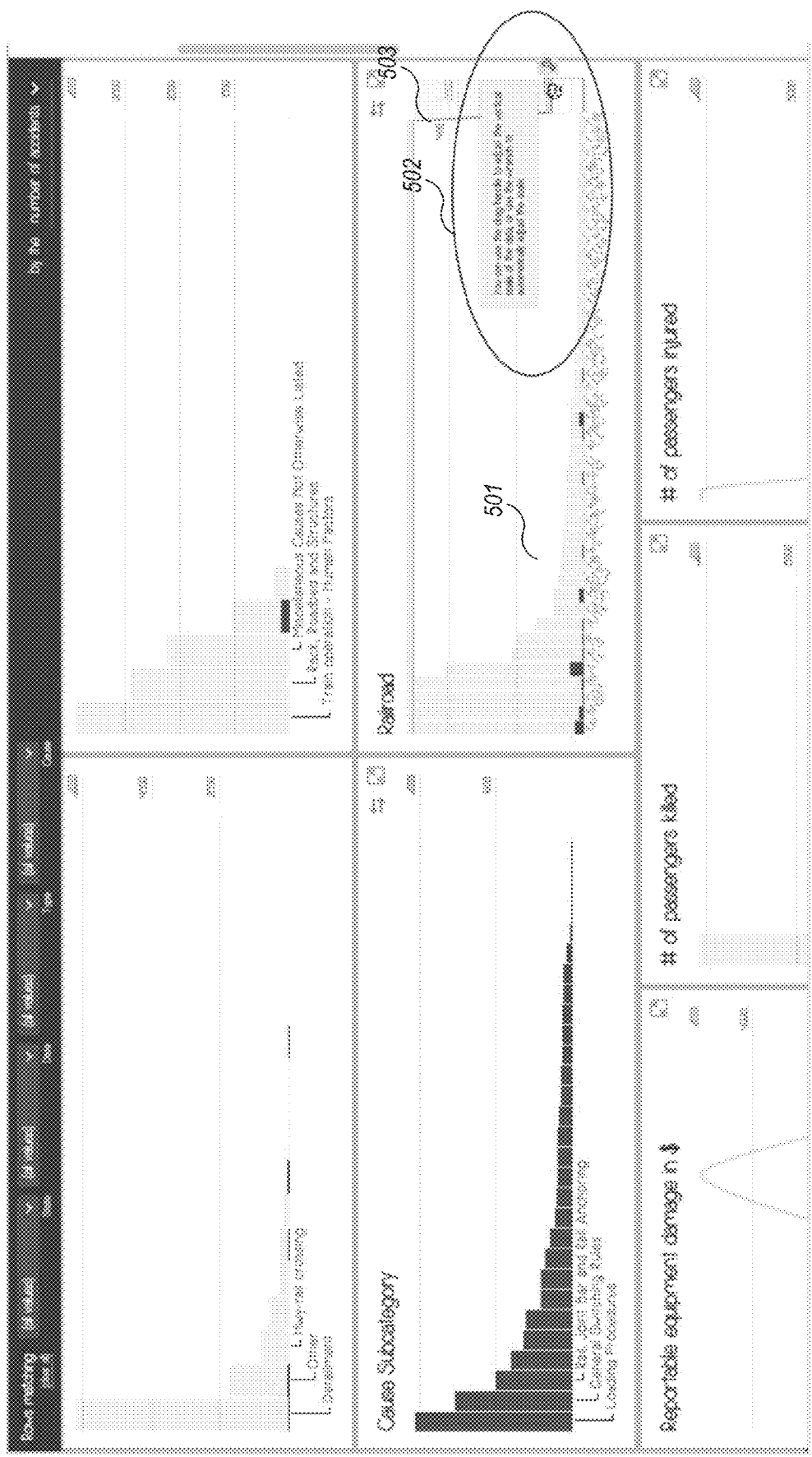

In FIG. 5B, when the user hovers over the handle icon described in FIG. 3E, a wrench icon is displayed with instructions 502. When drag handle is selected, the y-value range 403 becomes adjustable and the user widen or narrow (raise or lower the top end of) the y-value range. As shown in FIG. 5C, the user has dragged the drag handle 503 down towards zero to increase the number of railroads able to shown their values in the bar chart shown in UI card 501 (there are more bars shown in FIG. 5C than in FIG. 5B). The y-value top value is now 400 instead of 2000.

Figure 5D:
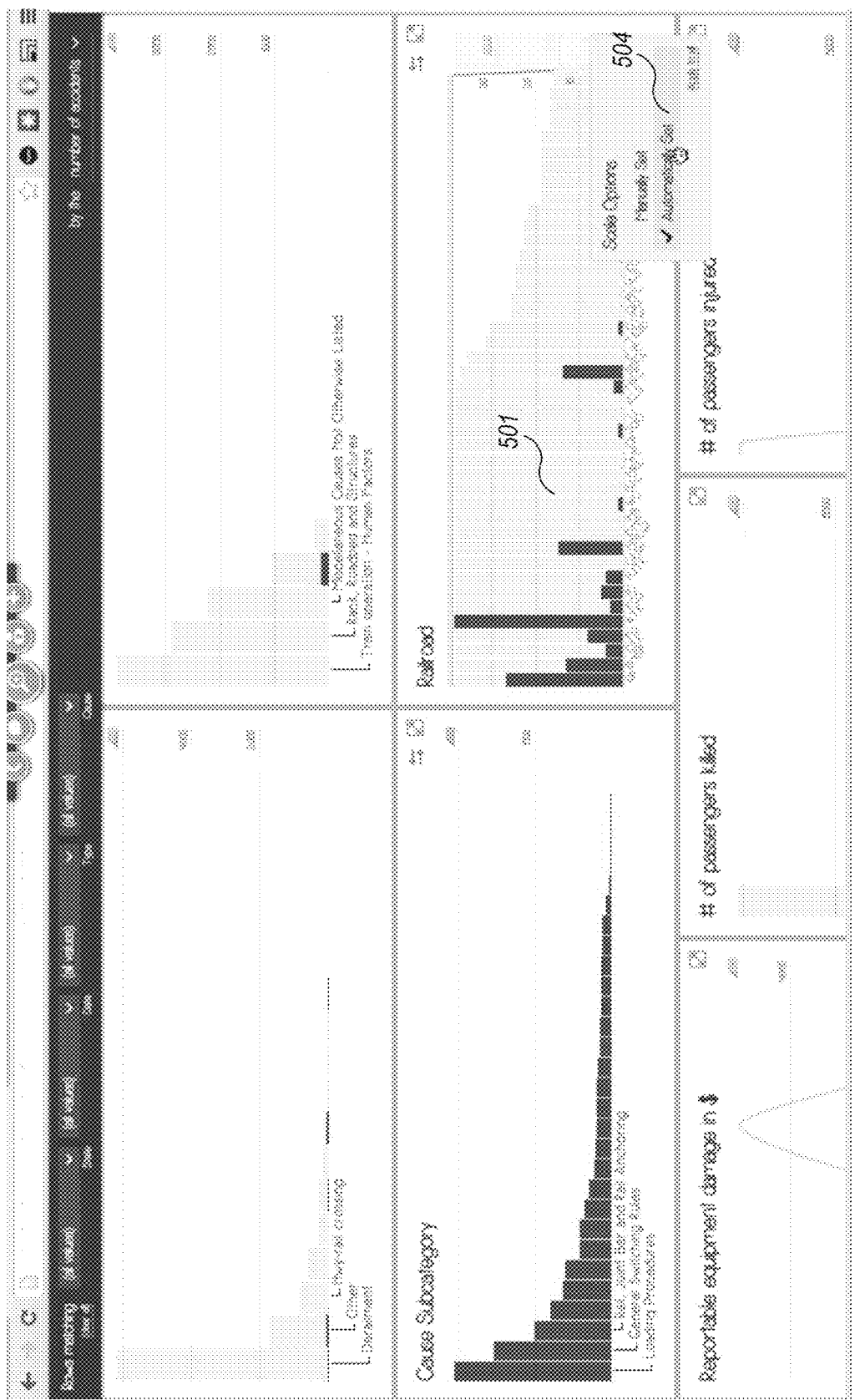
Figure 5E:
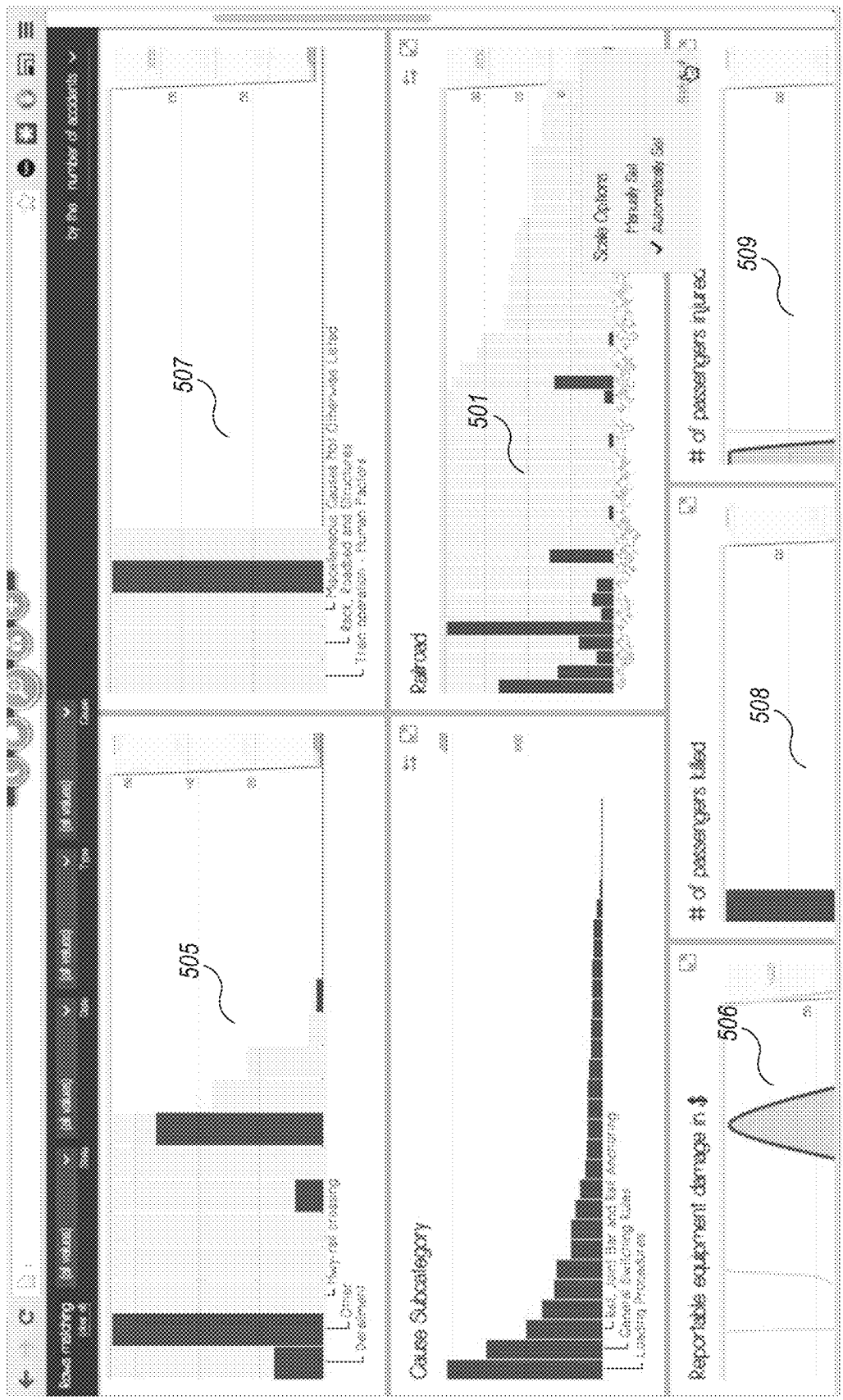

In FIG. 5D, the y-value range has been adjusted to 40 at the top end and the values for many more of the railroads can be observed. If the user wishes to have the ADVS automatically rescale the range of values for the y-axis of all displayed UI cards, then the user can select the wrench icon (see FIG. 5B) to display menu 504 to select the automatic option. If the user then selects "apply to all" on menu 504, then the ADVS automatically rescales all of the remaining displayed UI cards. This can be observed in FIG. 5E where, for example, more bars in the bar charts of UI cards 505, 507, and 508 are displayed in comparison to FIG. 5D and values of the histograms of UI cards 506 and 509 are displayed.

Automatic rescaling keeps the displayed UI cards proportional to the data values they are displaying without the user having to really understand factors such as the range of data values. This allows a user to gain "at a glance" information concerning influencing content values.

Figure 6:
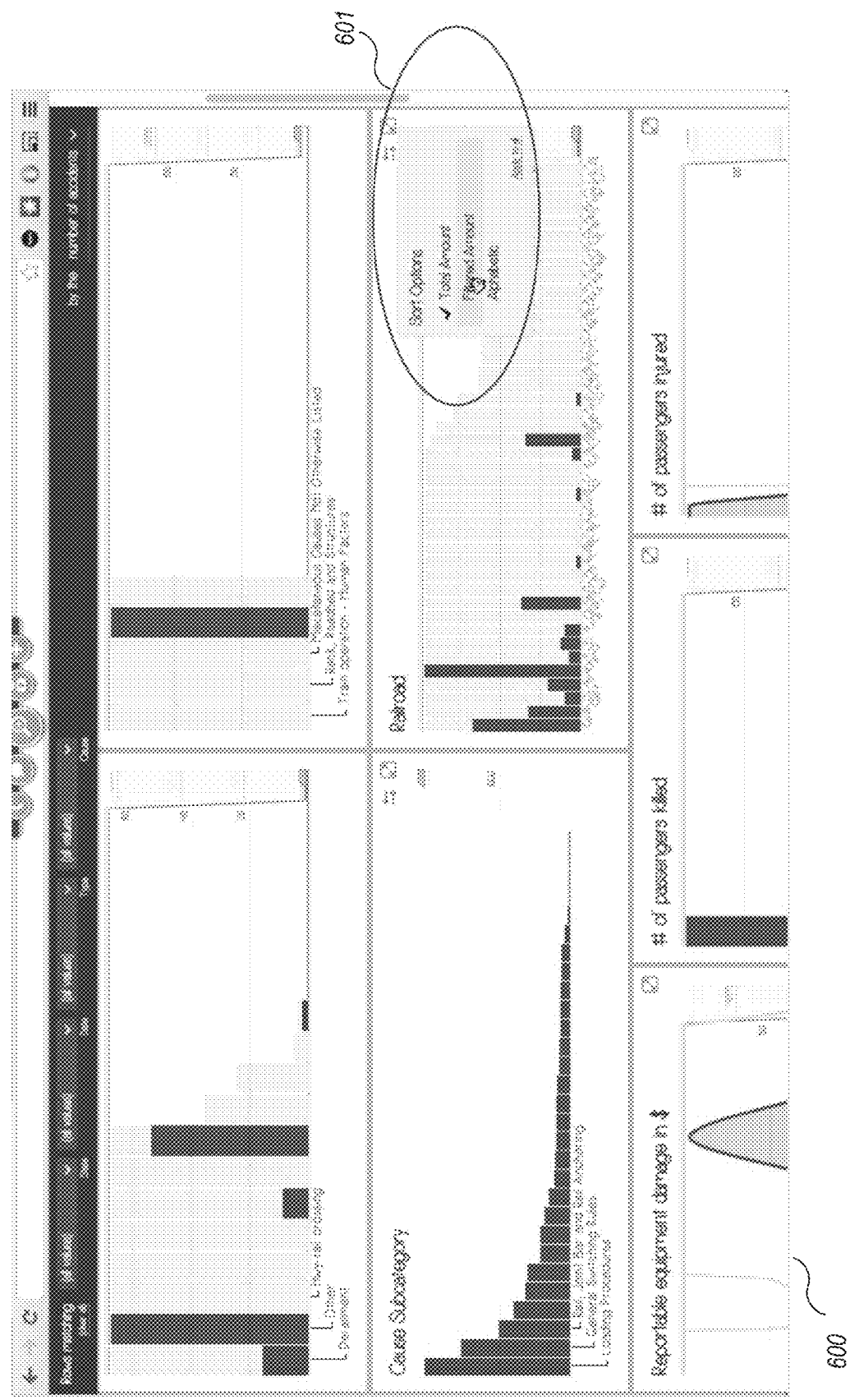
FIG. 6 is an example screen display illustrating automatic sorting available using an example Automated Data Visualization System.

FIG. 6 is an example screen display illustrating automatic sorting available using an example Automated Data Visualization System. Content can be sorted by amounts (y-values) of the data for the attribute, by those filtered (e.g., only relevant to dates selected, locations, ranges, etc. as indicated by certain UI cards or by menu 601, or in alphabetic order of attribute value (e.g., railroad names alphabetically presented). A user is able to select which way to sort data being presented in a UI card by means of menu 602. If the user selects the "Apply to All" option, then all of the cards are sorted by the selected method.

Although the techniques of the Automated Data Visualization System are generally applicable to any type of data content, the phrase "data" is used generally to imply any type of data object that can be visually represented. In addition, user interfaces other than UI cards can be used to achieve the automated visualization techniques described. Also, although the examples described herein often refer to a web page, the techniques described herein can also be used by other types of client server systems and monolithic computer systems. Essentially, the concepts and techniques described are applicable to any visual presentation of data confined to a single display area.

Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement an Automated Data Visualization System to be used for automatic visualization of very large data sets. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 7:
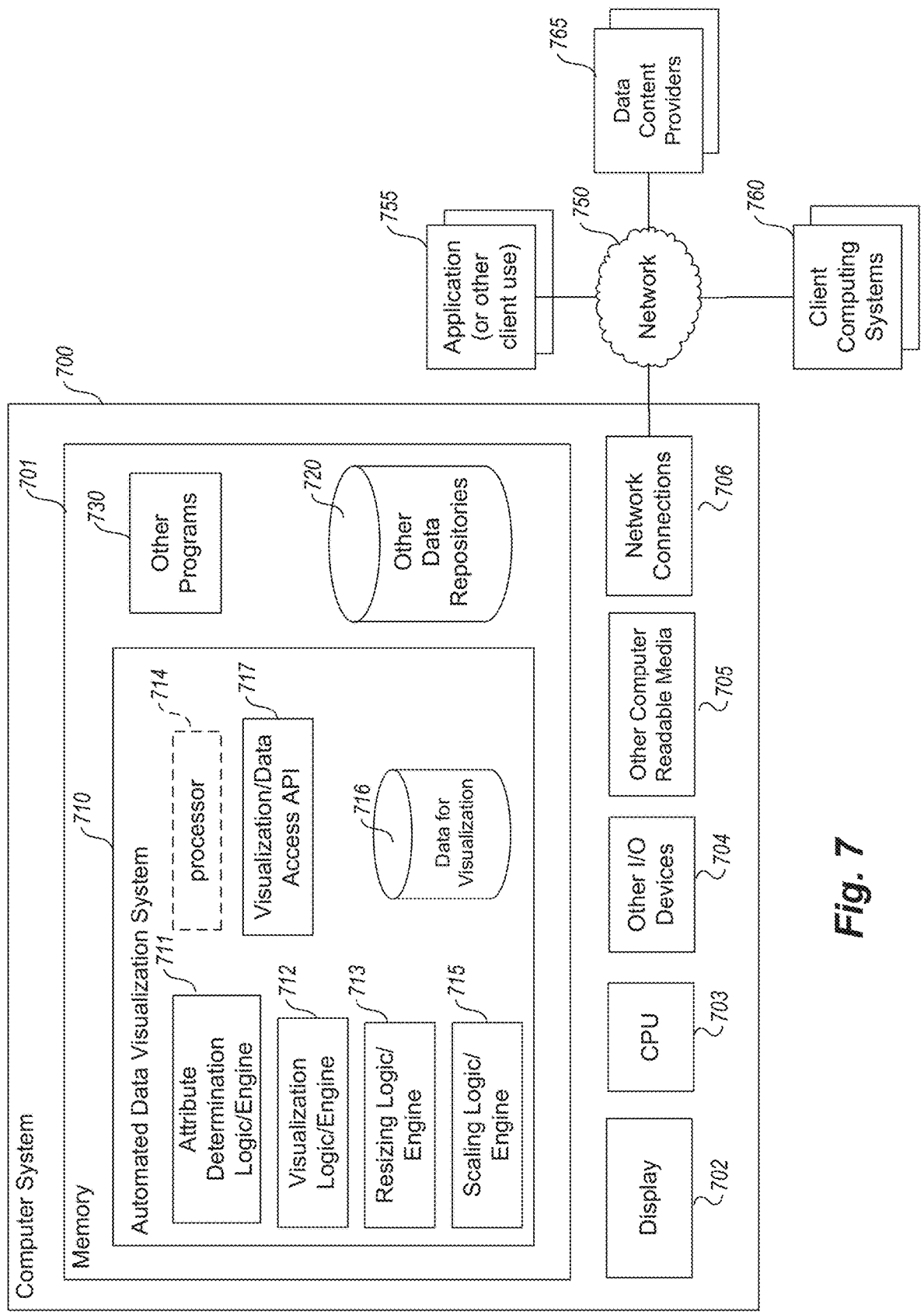
FIG. 7 is an example block diagram of a computing system for practicing embodiments of an Automated Data Visualization System.

FIG. 7 is an example block diagram of a computing system to practice embodiments of an Automated Data Visualization System described herein. Note that one or more general purpose virtual or physical computing systems suitably and precisely instructed or a special purpose computing system may be used to implement an ADVS. Further, the ADVS may be implemented in software, hardware, firmware, or in some combination to achieve the capabilities described herein.

The computing system 700 may comprise one or more server and/or client computing systems and may span distributed locations. In addition, each block shown may represent one or more such blocks as appropriate to a specific embodiment or may be combined with other blocks. Moreover, the various blocks of the Automated Data Visualization System 710 may physically reside on one or more machines, which use standard (e.g., TCP/IP) or proprietary interprocess communication mechanisms to communicate with each other.

In the embodiment shown, computer system 700 comprises a computer memory ("memory") 701, a display 702, one or more Central Processing Units ("CPU") 703, Input/Output devices 704 (e.g., keyboard, mouse, CRT or LCD display, etc.), other computer-readable media 705, and one or more network connections 706. The ADVS 710 is shown residing in memory 701. In other embodiments, some portion of the contents, some of, or all of the components of the ADVS 710 may be stored on and/or transmitted over the other computer-readable media 705. The components of the Automated Data Visualization System 710 preferably execute on one or more CPUs 703 and manage the automated data visualization of large data, as described herein. Other code or programs 730 and potentially other data repositories, such as data repository 720, also reside in the memory 701, and preferably execute on one or more CPUs 703. Of note, one or more of the components in FIG. 7 may not be present in any specific implementation.

In a typical embodiment, the ADVS 710 includes one or more Attribute Determination logic/engines 711, one or more Visualization logic/engines 712, Resizing logic/engines 713, and one or more Scaling logic/engines 715. These components act in concert to provide automatic visualization, resizing and rescaling of data as described in FIGS. 2-5. In at least some embodiments, the Attribute Determination logic/engine is provided external to the ADVS 710 and is available, potentially, over one or more networks 750. Other and/or different modules may be implemented. In addition, the ADVS 710 may interact via a network 750 with application or client code 755 that uses one or more of the visualization 712, resizing 713, or rescaling logic/engine 715 to present other interfaces or access points. The ADVS 710 may also interact via network 750 with one or more client computing systems 760 to displayed the automated visualization, and/or one or more third-party information provider systems 765 that provide the data content from the backend systems of external organizations. Also, of note, the data visualization data repository 716 may be provided external to the ADVS 710 as well, for example in a knowledge base accessible over one or more networks 750.

In an example embodiment, components/modules of the ADVS 710 may be implemented using standard programming techniques. For example, the ADVS 710 may be implemented as a "native" executable running on the CPU 103, along with one or more static or dynamic libraries. In other embodiments, the ADVS 710 may be implemented as instructions processed by a virtual machine. A range of programming languages known in the art may be employed for implementing such example embodiments, including representative implementations of various programming language paradigms, including but not limited to, object-oriented, functional, procedural, scripting, and declarative.

The embodiments described above may also use public or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the ADVS 710 (e.g., in the data repository 716) can be available by mechanisms such as through C, C++, C#, and Java APIs (e.g., through Visualization/Data Access API 717); libraries for accessing files, databases, or other data repositories; through scripting languages such as XML; or through Web servers, FTP servers, or other types of servers providing access to stored data. The data repository 716 may be implemented as one or more database systems, file systems, or any other technique for storing such information, or any combination of the above, including implementations using distributed computing techniques.

Some embodiments of the ADVS 710 include its own processor 714 for providing computational support for the automated update of the UI cards. Also the example ADVS 710 may be implemented in a distributed environment comprising multiple, even heterogeneous, computer systems and networks. Different configurations and locations of programs and data are contemplated for use with techniques of described herein. In addition, the server and/or client may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an ADVS.

Furthermore, in some embodiments, some or all of the components of the ADVS 710 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

As described in FIGS. 3-6, some of the functions of an Automated Data Visualization System is to automatically resized and/or to automatically rescale the UI cards being presented.

Figure 8A:
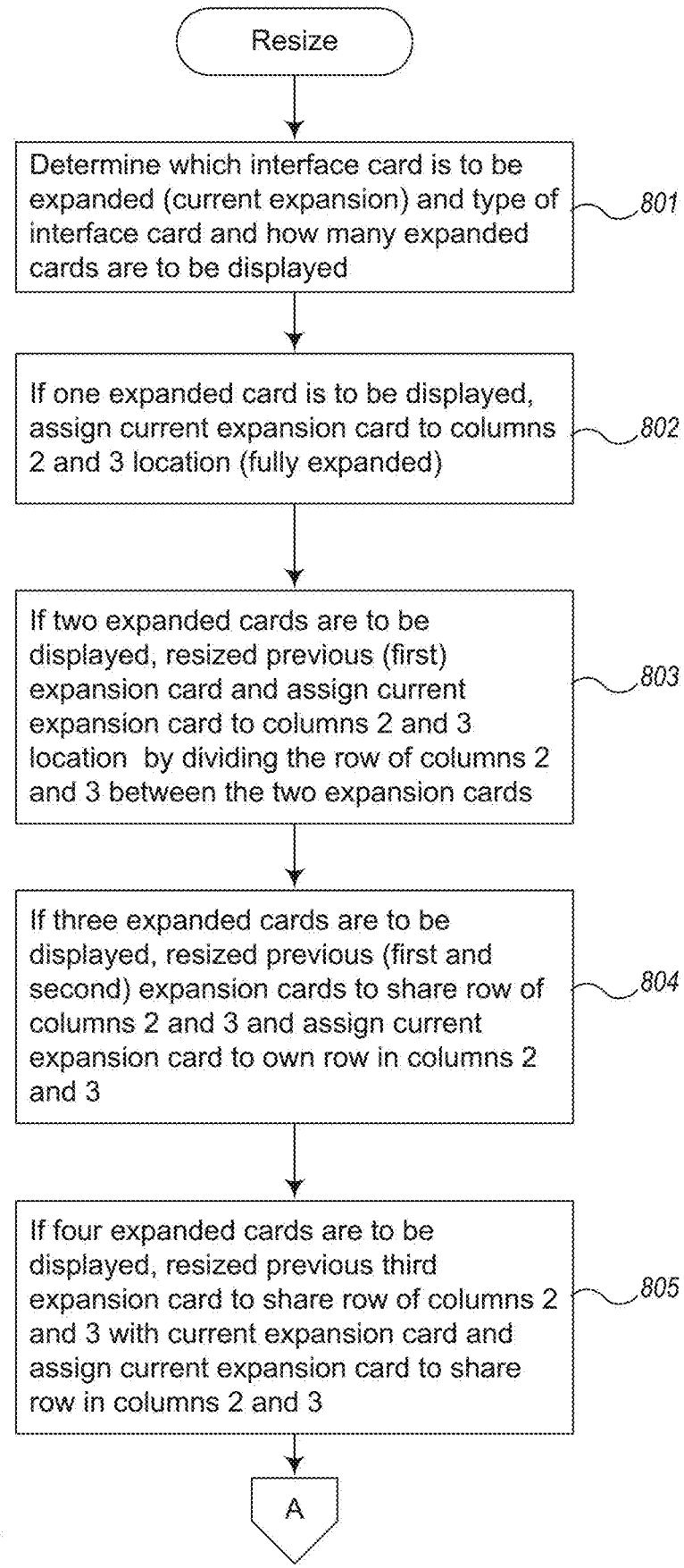
FIGS. 8A-8B is an example flow diagram of resizing logic provided by an example Automated Data Visualization System to implement automatic resizing.
Figure 8B:
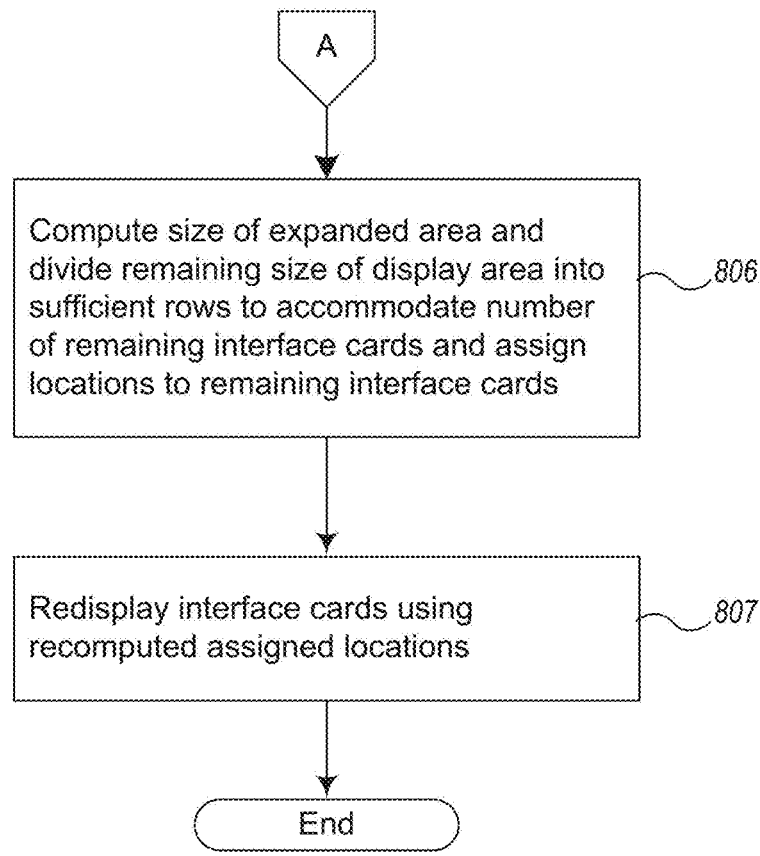

FIGS. 8A-8B is an example flow diagram of resizing logic provided by an example Automated Data Visualization System to implement automatic resizing. In overview, as described with reference to the user interface paradigm described in FIGS. 4A-4E, the ADVS determines how to resize the UI cards based upon a set of heuristics and the display grid being used. In the example shown therein, the display grid comprises three columns and a number of rows needed to show all of the UI cards in a web page of a determined size. FIGS. 8A-8B illustrate one embodiment that can be used to provide automated resizing.

In block 801, the ADVS determines which UI card is to be expanded (enlarged), the type of UI card (e.g., bar chart, map, histogram, etc.), and how many cards are to be displayed. In block 802, if one enlarged UI card is to be enlarged and displayed, the one card is assigned to the location corresponding to then enlarged display area (e.g., columns 2 and 3 in total). In block 803, if two UI cards are to be enlarged, the first enlarged card is resized and assigned to half of the enlarged display area and the current enlarged card is resized and assigned to the other half. In one embodiment the halves are formed by dividing the space horizontally—into two halves one above the other.

In block 804, if three UI cards are to be enlarged and displayed, the former two enlarged cards are resized to share one horizontal half of columns 2 and 3 and the new enlarged card is resized (enlarged) and assigned its own row of columns 2 and 3. Thus, enlarged cards one and two occupy a quarter each of the enlarged display area and enlarged card three occupies one half of the enlarged display area. In other embodiments, one of the other cards, e.g., the first card that was enlarged, is resized and assigned to half the enlarged display area and the second and third card share the remaining space.

In block 805, if four UI cards are to be enlarged and displayed, all four cards are sized or resized to capture one quarter of the enlarged display area (e.g., of columns 2 and 3) and assigned to their corresponding locations. Other corresponding resizing and assigning takes place if the grid is sized differently, for example, with 4 columns instead of three, accommodating easily 6 enlarged windows instead of 4. In block 806, the size of the enlarged display area is computed to determine the size of the remainder of the display area. This is then divided into sufficient rows to accommodate the number of remaining interface cards. Corresponding locations are then assigned to the remaining interface cards.

In block 807 all of the UI cards are displayed using their corresponding recomputed assigned locations.

Other algorithms for implementing automatic resizing can be similarly accommodated.

Figure 9:
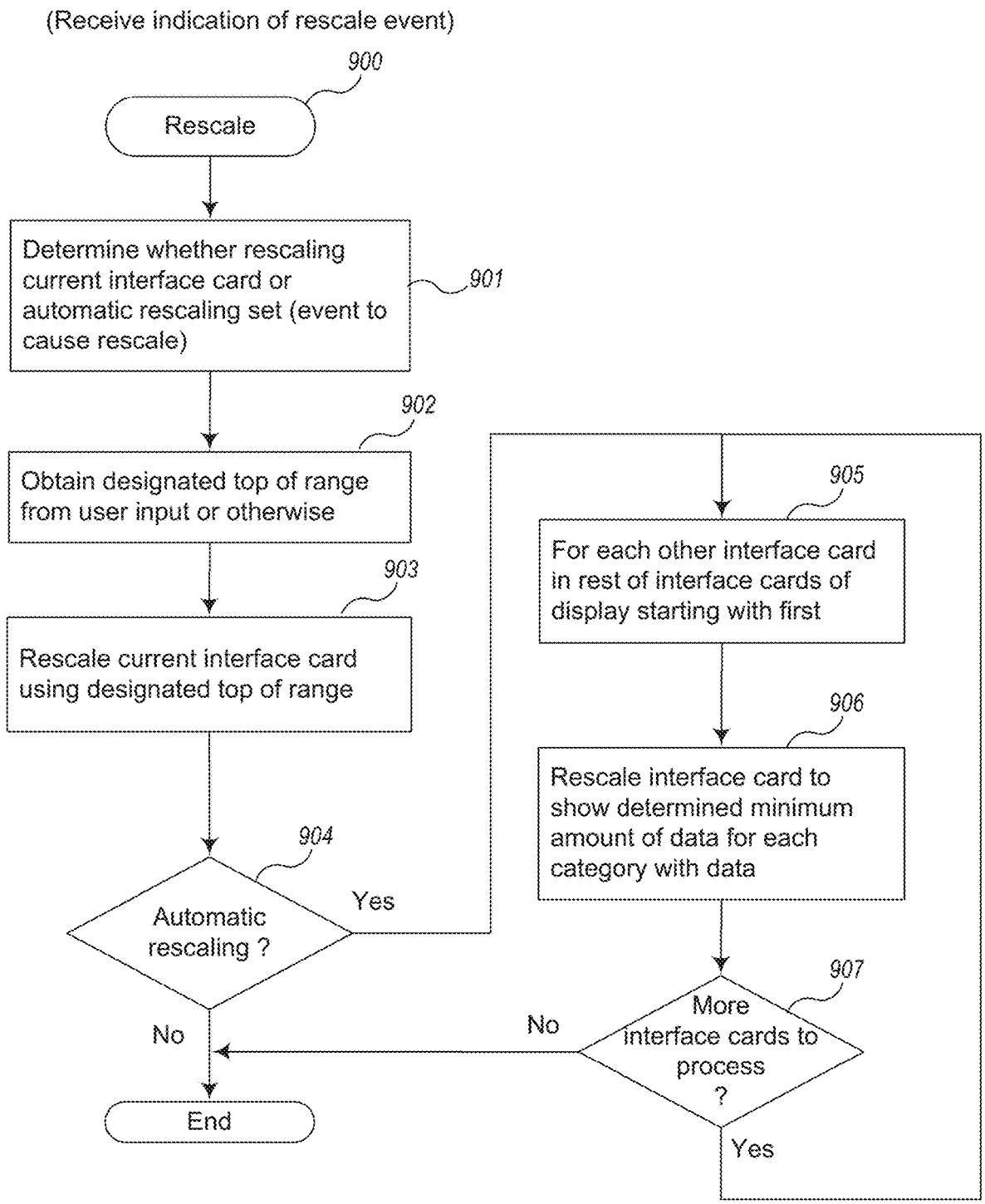
FIG. 9 is an example flow diagram of rescaling logic provided by an example Automated Data Visualization System to implement automatic rescaling.

FIG. 9 is an example flow diagram of rescaling logic provided by an example Automated Data Visualization System to implement automatic rescaling. In overview, as described with reference to the user interface paradigm described in FIGS. 5A-5E, the ADVS determines how to automatically rescale the UI cards based upon value range where data is present in the data values of an attribute displayed in a UI card. For example, if the attribute is which railroad the accidents occurred took place and the data (number of accidents) for each of the attribute values (name of railroad) is a value between 0 and 100, then the scale of the y-axis is automatically selected to be able to display the values according to some heuristics such as the range that will show a majority of the values.

In response to some kind of rescale event, for example, a user selects a rescale automatically option with "apply to all", then in block 901, the ADVS determines whether to rescale the current UI card and whether automatic rescaling is set for all cards.

In block 902, the top of the y-axis range is determined from user or programmatic input. In block 903, the current UI card is rescaled using the designated top of the y-axis range. In block 904, the ADVS determines whether automatic rescaling has been selected and if so continues in block 905, otherwise ends the rescaling process logic.

Blocks 905-907 implement a loop to rescale all of the remaining cards. In particular, in block 905, the ADVS for each remaining UI card starting with the first: rescales the UI card to show a determined minimum amount of data for each category having data (block 906); in block 907 determines whether there are more remaining cards to process and if so continues to top of loop at block 905, otherwise exits the loop to end the rescaling process logic.

The determined minimum amount of data to display for each category (attribute type) containing data, such as hours accidents occurred versus which railroad, may vary and the ADVS takes this into account. For example, bar charts for railroad ID may be determined to show a minimum of 1 accident whereas hour accidents occurred may be determined to show each of the 24 hours cycle or ranges of 4 hour periods, or the like. Maps may be determined to show a minimum amount of areas having 10 or more accidents. In other words, different data items have attributes (columns in a tabular structure) with different minimum value ranges that are to be shown. This can be designated ahead of time in the ADVS for types of attributes or determined dynamically, for example, based upon the occurrence of data values.

Other algorithms for implementing automatic rescaling can be similarly accommodated.

Additional Aspects

The following additional aspects are contemplated by the exemplary methods, systems, and techniques described herein:

A computer-implemented method in a computing system for automatically presenting a large data set for enhanced visualization and searching, the data comprising a plurality of data records related to a designated topic, each data record having a plurality of attribute values, each corresponding to an attribute of the topic, each attribute value having a data type, wherein the plurality of data records comprise at least tens of millions of data records, the method comprising:

determining which attributes of the designated topic are to be presented;

for each determined attribute to be presented, automatically presenting each of the plurality of data records that contain an attribute value corresponding to the determined attribute in a user interface card associated with the determined attribute;

receiving an indication that a user has selected, as a filter for an attribute presented by one of the user interface cards, an attribute value or range of values that would cause corresponding attribute values in at least some of the other of the user interface cards to become difficult to see, when updated to accommodate the filter, because a smaller amount of information would be available for display once the corresponding attribute values are filtered;

automatically rescaling visualizations of the corresponding attribute values in the at least some of the other of the user interface cards in order to display more information when the at least some of the other of the user interface cards are updated to accommodate the filtered attribute; and automatically presenting the one user interface card with the filtered attribute and the rescaled user interface cards to facilitate viewing more information.

The above method wherein the automatically rescaling is only performed after the user has set an option for automatic rescaling.

The above method wherein automatically rescaling visualizations of the attribute values in a user interface card is performed when the filtered information occupies less than a first percentage of the y-axis scale of the user interface card, a determined number of pixels, a percentage height of the possible height represented by the attribute values of the user interface card, or a portion of height of the user interface card.

The above method wherein each user interface card shows a histogram or distribution chart, a search input control, a map, or a timeline.

A computer-readable memory medium containing instructions that, when executed, control a computer processor to rescale one or more interface cards by performing a method comprising:

determining which attributes of the designated topic are to be presented;

for each determined attribute to be presented, automatically presenting each of the plurality of data records that contain an attribute value corresponding to the determined attribute in a user interface card associated with the determined attribute;

receiving an indication that a user has selected, as a filter for an attribute presented by one of the user interface cards, an attribute value or range of values that would cause corresponding attribute values in at least some of the other of the user interface cards to become difficult to see, when updated to accommodate the filter, because a smaller amount of information would be available for display once the corresponding attribute values are filtered;

automatically rescaling visualizations of the corresponding attribute values in the at least some of the other of the user interface cards in order to display more information when the at least some of the other of the user interface cards are updated to accommodate the filtered attribute; and automatically presenting the one user interface card with the filtered attribute and the rescaled user interface cards to facilitate viewing more information.

A computing system for rescaling user interface cards used to present large data for enhanced visualization, the data comprising a plurality of data records related to a designated topic, each data record having a plurality of attribute values, each corresponding to an attribute of the topic, each attribute value having a data type, wherein the plurality of data records comprise at least tens of millions of data records, comprising:

attribute logic that is structured to determine which attributes of the data set are to be presented for visualization based upon the designated topic; and visualization logic that is structured to:

automatically present each of the plurality of data records that contain an attribute value corresponding to the determined attribute in a user interface card associated with the determined attribute;

receive an indication that a user has selected, as a filter for an attribute presented by one of the user interface cards, an attribute value or range of values that would cause corresponding attribute values in at least some of the other of the user interface cards to become difficult to see, when updated to accommodate the filter, because a smaller amount of information would be available for display once the corresponding values are filtered;

automatically rescale visualizations of the corresponding attribute values in the at least some of the other of the user interface cards in order to display more information when the at least some of the other of the user interface cards are updated to accommodate the filtered attribute; and automatically present the one user interface card with the filtered attribute and the rescaled user interface cards to facilitate viewing more information.

The above computing system wherein the visualization logic performs rescaling only upon receiving an indication from a user that automatic rescaling is desired.

From the foregoing it will be appreciated that, although specific embodiments have been described herein for purposes of illustration, various modifications may be made without deviating from the spirit and scope of the invention. For example, the methods, techniques, and systems for performing automatic visualization of large data discussed herein are applicable to other architectures other than a web based architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer implemented method in a computing system for automatically presenting a large data set for visualization and/or searching, the data set comprising a plurality of data records related to a designated topic, each data record representable as a row of data and having an associated plurality of attributes, each associated attribute, when present in a data record, representable as an attribute value in a column of data and having a data type, the method comprising:

determining which attributes of the data set are to be presented for visualization based upon the designated topic;

for each determined attribute to be presented, under control of the computing system, automatically determining, without further user input, based upon the data type of the determined attribute, a particular user interface presentation to display on a display device associated with the computing system, wherein the user interface presentation is one of a user interface card showing a histogram or distribution chart, a user interface card showing a search input control, a user interface card showing a map, a user interface card showing a bar, column, or pie chart, or a user interface card showing a timeline, and wherein, when the attribute value is text, a further determination of cardinality of a value for an attribute is made, and when the cardinality is below a threshold value, a respective user interface card presenting a bar chart or column chart is presented and when the cardinality is above a threshold value, a respective user interface card presenting a search input control is presented, wherein the search input control is configured to receive a keyed entry from a user, and wherein the keyed entry is a text string; and under control of the computing system, automatically generating a visualization of the determined attribute according to the automatically determined user interface card, the visualization including data from each of the plurality of data records that contains an associated attribute value for the determined attribute; and under control of the computing system, automatically resizing the generated visualizations and presenting the resized visualizations on the display device to show all determined user interface cards on the display at once.

2. The method of claim 1 wherein the data set comprise at least tens of millions of data records.

3. The method of claim 1 wherein the determining which attributes of the data set are to be presented comprises determining which attributes are most important to the designated topic and wherein the automatically resizing the generated visualization and presenting the resized visualizations presents the determined user interface cards for the determined most important attributes before presenting the determined user interface cards for other determined attributes of the data set.

4. The method of claim 3 wherein the determining which attributes are most important to the designated topic uses at least one of: a predetermined ordering of attributes, or importance of attributes.

5. The method of claim 1 wherein the automatically determining, without further user input, based upon the data type of the attribute value, a particular user interface presentation to display on a display device associated with the computing system, determines that, when the attribute value is numerical, a user interface card showing a histogram or other type of distribution chart is to be presented.

6. The method of claim 1 wherein the threshold value is computed as a function of the size of the data set and/or the frequency of occurrence of each unique attribute value of the attribute.

7. The method of claim 1 wherein the automatically determining, without further user input, based upon the data type of the attribute value, a particular user interface presentation to display on a display device associated with the computing system, determines that, when the attribute value is a date, a user interface card showing a timeline is presented.

8. The method of claim 1 wherein the automatically determining, without further user input, based upon the data type of the attribute value, a particular user interface presentation to display on a display device associated with the computing system, determines that, when the attribute value is a location or a latitude and/or longitude, a user interface card showing a map is presented.

9. The method of claim 1 wherein the automatically determining, without further user input, based upon the data type of the attribute value, a particular user interface presentation to display on a display device associated with the computing system, determines the particular user interface card to present using machine learning techniques.

10. The method of claim 9 wherein the machine learning techniques include at least one of: k-means clustering, clustering, Bayesian algorithms, or Support Vector Machines.

11. The method of claim 1 wherein the automatically resizing the generated visualizations and presenting the resized visualizations on the display device to show all determined user interface cards on the display at once presents a plurality of rows of users interface cards, wherein each row is configured to display its own number of user interface cards such that the number of cards displayed in each row of user interface cards may be different from row to row.

12. The method of claim 1, further comprising: in response to receiving an indication that one or more of the presented user interface cards has been deleted or resized, automatically resizing the remainder of the user interface cards already presented on the display screen.

13. A computer-readable memory medium containing instructions that, when executed, control a computer processor to automatically present a large data set having tens of millions of data records for visualization and/or searching, the data set comprising a plurality of data records related to a designated topic, each data record representable as a row of data and having an associated plurality of attributes, each associated attribute, when present in a data record, representable as an attribute value in a column of data and having a data type, by performing a method comprising:

determining which attributes of the data set are to be presented for visualization based upon the designated topic;

for each determined attribute to be presented, under control of the computing system, automatically determining, without further user input, based upon the data type of the determined attribute, a particular user interface presentation to display on a display device associated with the computing system, wherein the user interface presentation is one of a user interface card showing a histogram or distribution chart, a user interface card showing a search input control, a user interface card showing a map, a user interface card showing a bar, column, or pie chart, or a user interface card showing a timeline, and wherein, when the attribute value is text, a further determination of cardinality of a value for an attribute is made, and when the cardinality is below a threshold value, a respective user interface card presenting a bar chart or column chart is presented and when the cardinality is above a threshold value, a respective user interface card presenting a search input control is presented, wherein the search input control is configured to receive a keyed entry from a user, and wherein the keyed entry is a text string; and under control of the computing system, automatically generating a visualization of the determined attribute according to the automatically determined user interface card, the visualization including data from each of the plurality of data records that contains an associated attribute value for the determined attribute; and under control of the computing system, automatically resizing the generated visualizations and presenting the resized visualizations on the display device to show all determined user interface cards on the display at once.

14. A computing system for visualization of large data sets comprising tens of millions of data records relating to a designated topic, each data record representable as a row of data and having an associated plurality of attributes, each associated attribute when present in a data record represented as an attribute value in a column of data and having a data type, comprising:

attribute determination logic that is structured to determine which attributes of the data set are to be presented for visualization based upon the designated topic;

visualization logic that is structured to, for each determined attribute to be presented, automatically:

determine, without further user input, based upon the data type of the determined attribute, a particular user interface presentation to display on a display device associated with the computing system, wherein the user interface presentation is one of a user interface card showing a histogram or distribution chart, a user interface card showing a search input control, a user interface card showing a map, a user interface card showing a bar, column, or pie chart, or a user interface card showing a timeline, and wherein, when the attribute value is text, further determine a cardinality of a value for an attribute is made, and when the cardinality is below a threshold value, a respective user interface card presenting a bar chart or column chart is presented and when the cardinality is above a threshold value, a respective user interface card presenting a search input control is presented, wherein the search input control is configured to receive a keyed entry from a user, and wherein the keyed entry is a text string; and generate a visualization of the determined attribute according to the determined user interface card including data from each of the plurality of data records that contains an associated attribute value for the determined attribute; and resizing logic that is structured to automatically resize the generated visualizations and present the resized visualizations on the display device to show all determined user interface cards on the display at once.

15. The computing system of claim 14 wherein the visualization logic is structured to present attributes as user interface cards in an order of importance to the designated topic.

16. The computing system of claim 14 wherein the visualization logic is structured to present attributes having attribute values that are numerical as a histogram or other type of distribution chart, attributes having attribute values that are textual as a bar or column chart or search input control, attributes having attribute values that include a date as a timeline, and attributes having attribute values that include a location or latitude and/or longitude as a map.

17. The computing system of claim 14 wherein the visualization logic uses machine learning techniques to determine which user interface presentation to display.

18. The computing system of claim 14 wherein the user interface cards are presented on the display device in rows, where each row has a number of user interface cards that may not be the same as other rows.

* * * * *